(12) United States Patent
Neumann

(10) Patent No.: US 10,815,964 B2
(45) Date of Patent: Oct. 27, 2020

(54) SYSTEM AND METHOD FOR MANUFACTURING WIND TURBINE ROTOR BLADES FOR SIMPLIFIED INSTALLATION AND REMOVAL

(71) Applicant: General Electric Company, Schenectady, NY (US)

(72) Inventor: Ulrich Werner Neumann, Simpsonville, SC (US)

(73) Assignee: General Electric Company, Schenectady, NY (US)

( * ) Notice: Subject to any disclaimer, the term of this patent is extended or adjusted under 35 U.S.C. 154(b) by 20 days.

(21) Appl. No.: 16/117,344

(22) Filed: Aug. 30, 2018

(65) Prior Publication Data

US 2019/0010920 A1    Jan. 10, 2019

Related U.S. Application Data

(62) Division of application No. 14/919,811, filed on Oct. 22, 2015, now Pat. No. 10,066,601.

(51) Int. Cl.
*F03D 1/06* (2006.01)
*F03D 13/10* (2016.01)
*F03D 13/20* (2016.01)

(52) U.S. Cl.
CPC ......... *F03D 1/0675* (2013.01); *F03D 1/0658* (2013.01); *F03D 13/10* (2016.05);
(Continued)

(58) Field of Classification Search
CPC ........ F03D 1/0675; F03D 13/10; F03D 13/20;
F03D 1/0633; F03D 1/0691; F03D 1/0658; F03D 1/06; F03D 80/00; F03D 80/88; F03D 13/00; Y02E 10/721; Y02E 10/722; F05B 2240/221; F05B 2240/2211;
(Continued)

(56) References Cited

U.S. PATENT DOCUMENTS 7,353,603 B2    4/2008  Wobben
7,735,290 B2    6/2010  Arsene
(Continued)

FOREIGN PATENT DOCUMENTS

CA    2692705 A1    8/2010
EP    2345811 B1    10/2012
(Continued)

*Primary Examiner* — Jun S Yoo
(74) *Attorney, Agent, or Firm* — Dority & Manning, P.A.

(57) ABSTRACT

The present disclosure is directed to systems and methods for manufacturing a wind turbine rotor blade that can be easily lifted and lowered to and from a rotor installed atop a tower. The method includes providing a plurality of root inserts for a blade root of the blade and securing at least one cylindrical member to one of the root inserts such that the cylindrical member is substantially perpendicular with the root insert. The method also includes arranging the root inserts in a blade mold of the blade and forming a blade shell with the plurality of root inserts laminated therein. The method may further include securing at least one attachment component within each of the cylindrical members so as to provide an attachment location for a pulley cable used to lift and lower the rotor blade to and from the rotor installed atop the tower.

8 Claims, 23 Drawing Sheets

(52) U.S. Cl.
CPC .......... *F03D 13/20* (2016.05); *F05B 2230/61* (2013.01); *F05B 2230/80* (2013.01); *Y02E 10/721* (2013.01); *Y02P 70/523* (2015.11)

(58) Field of Classification Search
CPC ............ F05B 2230/61; F05B 2230/604; F05B 2230/60; F05B 2220/30; F05B 2240/912; F05B 2280/6003; F05B 2240/30; F05B 2240/302; F05B 330/50; Y02P 70/523; B29L 2031/085; H02K 7/183; H02K 7/1838; B66C 1/108; B66C 23/183
See application file for complete search history.

(56) References Cited

U.S. PATENT DOCUMENTS

| | | |
|---|---|---|
| 7,785,073 B2 | 8/2010 | Wohben |
| 7,832,101 B2 | 11/2010 | Koesters |
| 7,877,934 B2 | 2/2011 | Livingston et al. |
| 8,033,791 B1 | 10/2011 | Watanabe |
| 8,052,396 B2 | 11/2011 | Wobben |
| 8,069,634 B2 | 12/2011 | Livingston et al. |
| 8,083,212 B2 | 12/2011 | Numajiri et al. |
| 8,118,552 B2 | 2/2012 | Nies |
| 8,191,253 B2 | 6/2012 | Vangsy |
| 8,240,962 B2 | 8/2012 | Livingston et al. |
| 8,360,398 B2 | 1/2013 | Diaz De Corcuera et al. |
| 8,528,735 B2 | 9/2013 | Nies |
| 8,562,302 B2 | 10/2013 | Bakhuis et al. |
| 8,584,355 B2 | 11/2013 | Holling |
| 8,591,187 B2 | 11/2013 | Bagepalli et al. |
| 8,595,931 B2 | 12/2013 | Riddell et al. |
| 8,602,700 B2 | 12/2013 | Johnson |
| 8,651,462 B2 | 2/2014 | Van Berlo et al. |
| 9,651,021 B2 | 5/2017 | Neumann et al. |
| 2007/0266538 A1 | 11/2007 | Bervang |
| 2007/0290426 A1 | 12/2007 | Trede et al. |
| 2009/0167023 A1 | 7/2009 | Nies |
| 2010/0018055 A1 | 1/2010 | Fornsgaard et al. |
| 2010/0028152 A1 | 2/2010 | Tomohro et al. |
| 2010/0139062 A1 | 6/2010 | Reed et al. |
| 2010/0254813 A1 | 10/2010 | Dawson et al. |
| 2011/0142636 A1 | 6/2011 | Curtin |
| 2012/0027561 A1 | 2/2012 | Riddell et al. |
| 2012/0076663 A1 | 3/2012 | From |
| 2012/0137481 A1 | 6/2012 | Lindberg et al. |
| 2012/0217089 A1 | 8/2012 | Fenger |
| 2013/0025113 A1 | 1/2013 | Arocena De La Rua et al. |
| 2013/0074335 A1 | 3/2013 | Amano |
| 2013/0098859 A1 | 4/2013 | See et al. |
| 2013/0236316 A1 | 9/2013 | Bitsch et al. |
| 2013/0236324 A1 | 9/2013 | Bech et al. |
| 2013/0285284 A1 | 10/2013 | Moeller Larsen et al. |
| 2013/0318789 A1* | 12/2013 | Gabeiras .................. B21K 3/04 29/889.7 |
| 2013/0330197 A1* | 12/2013 | Feigl ........................ F01D 5/30 416/219 R |
| 2014/0010658 A1 | 1/2014 | Nielsen |
| 2014/0356176 A1* | 12/2014 | Caruso .................. F03D 1/0658 416/219 R |
| 2015/0361950 A1 | 12/2015 | Pipo Benito |
| 2017/0002660 A1 | 1/2017 | Samudrala et al. |

FOREIGN PATENT DOCUMENTS

| | | |
|---|---|---|
| EP | 2369174 B1 | 11/2012 |
| EP | 2616670 A1 | 7/2013 |
| JP | 2006152862 A | 6/2006 |
| WO | WO2010/147480 A1 | 12/2010 |
| WO | WO2011/064659 A2 | 6/2011 |
| WO | WO2011/095167 A2 | 8/2011 |
| WO | Wo2012/065613 A1 | 5/2012 |

* cited by examiner

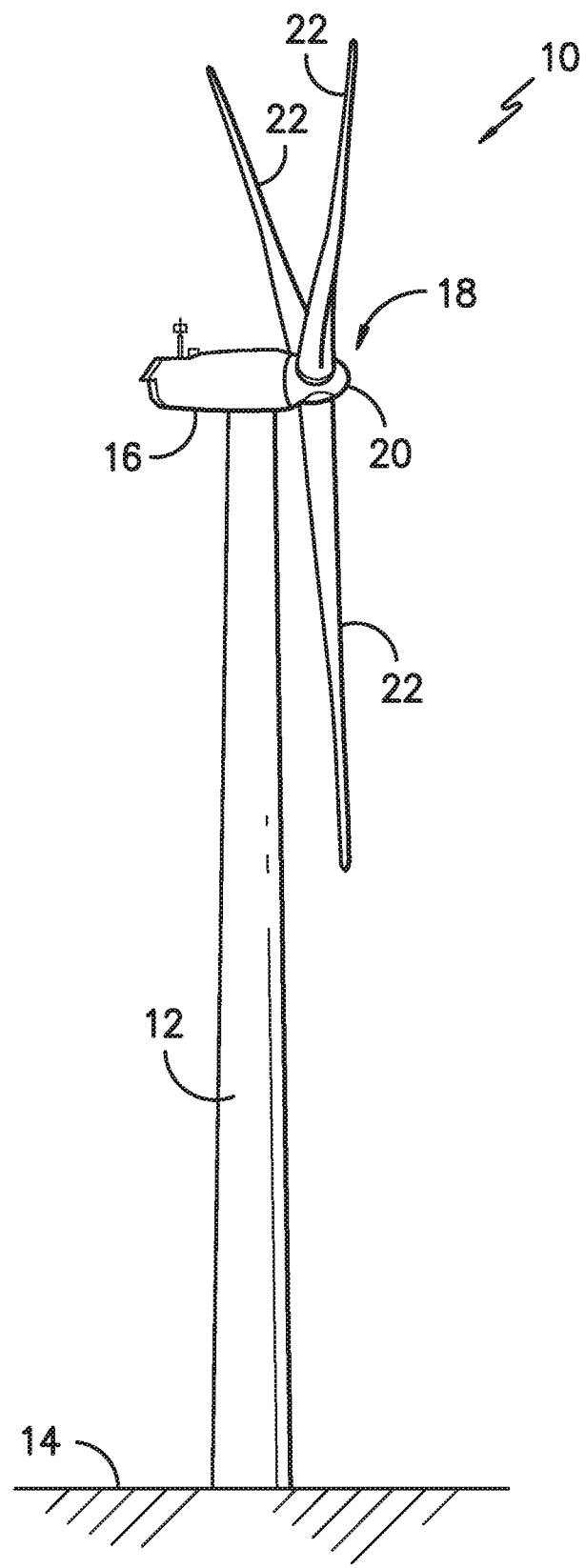
FIG. -1-

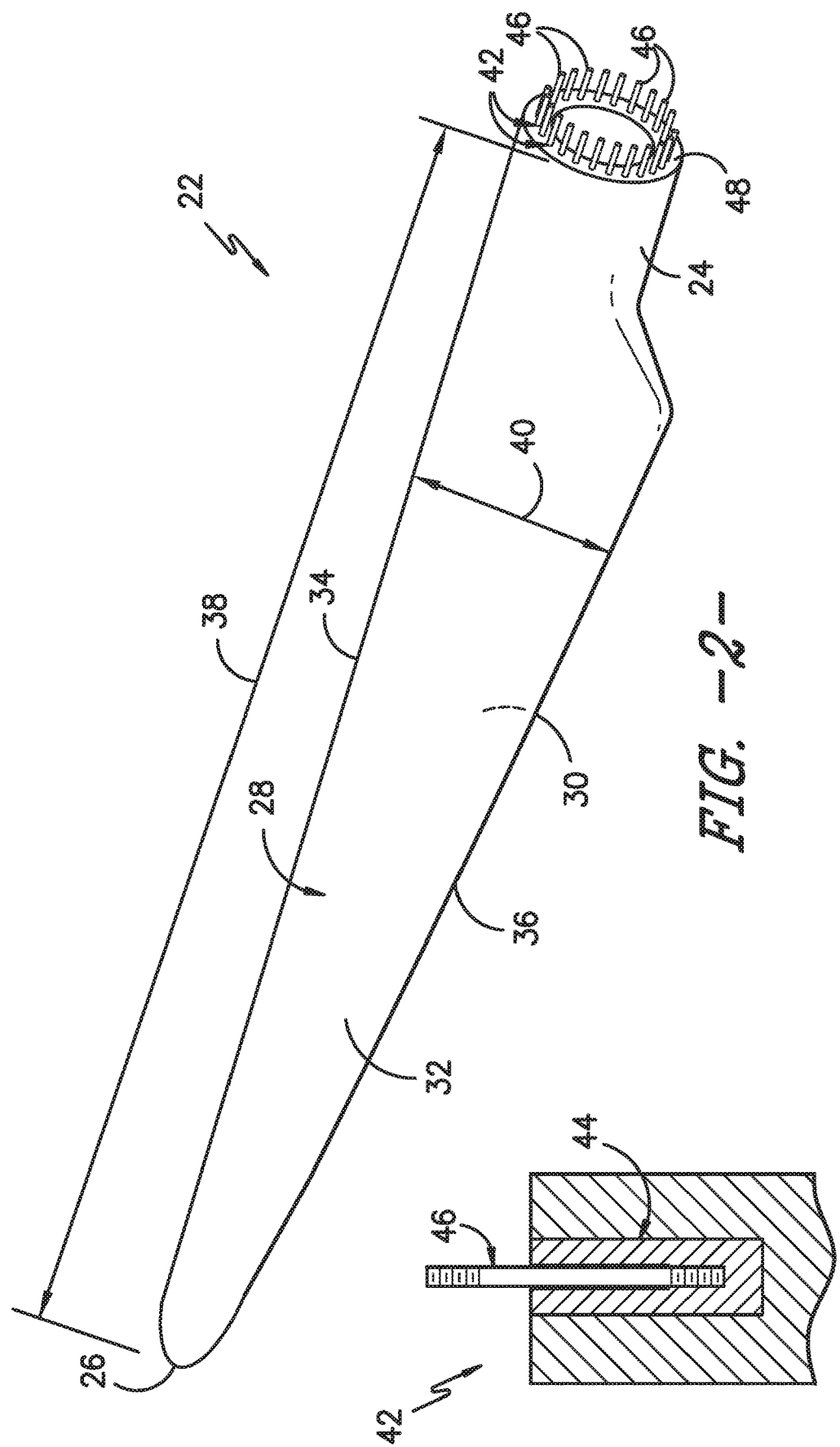

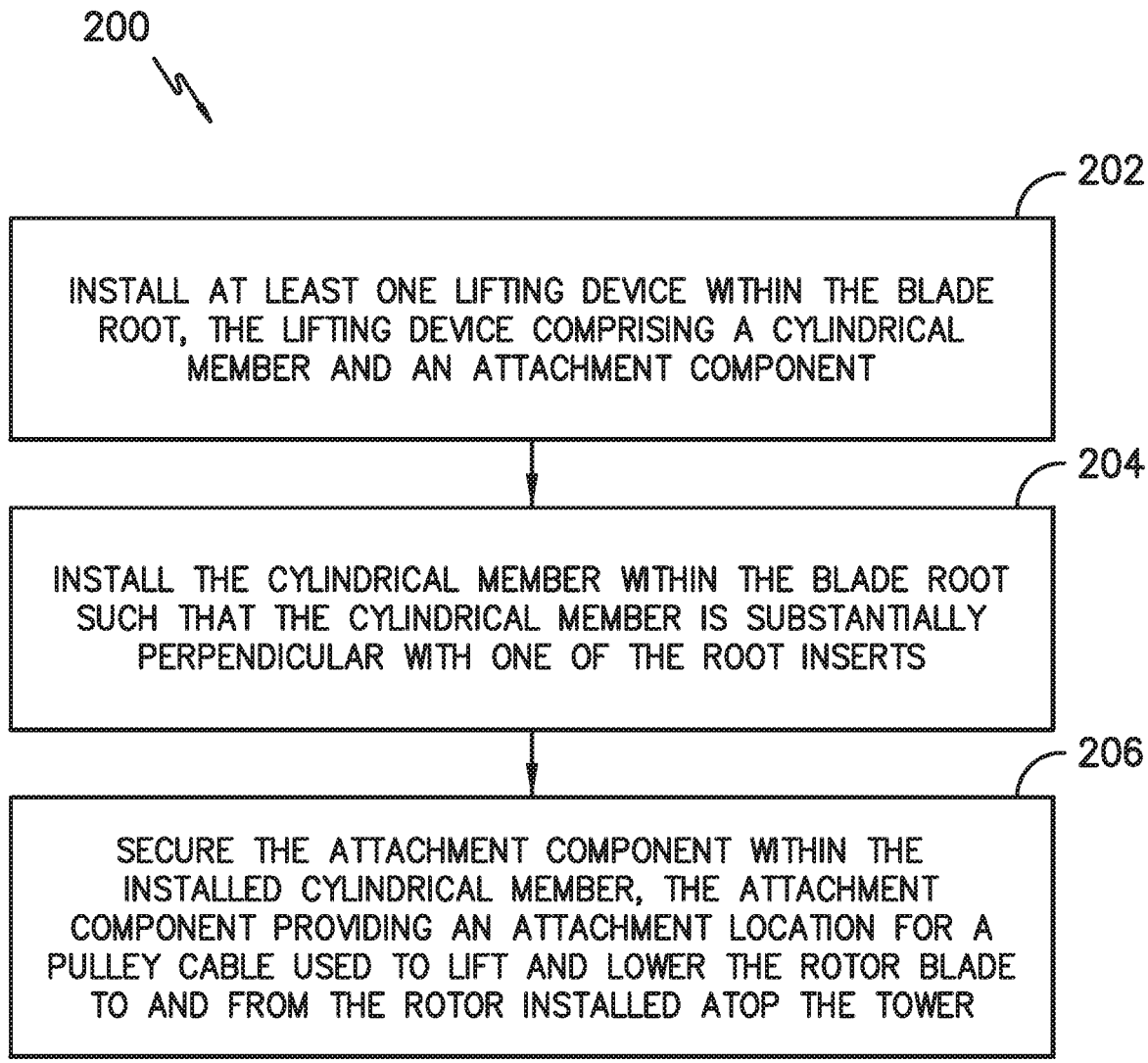
FIG. -4-

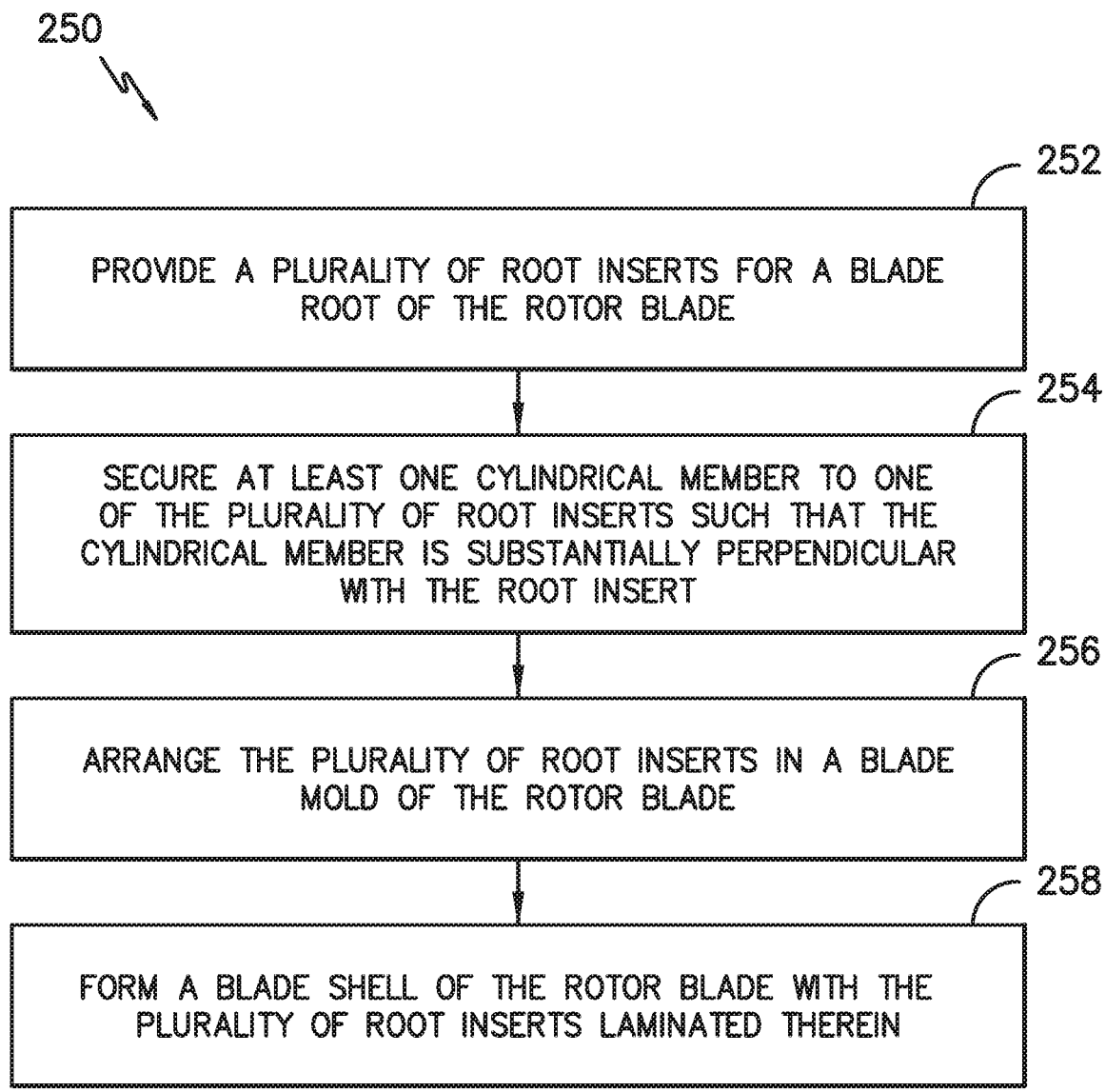
FIG. -5-

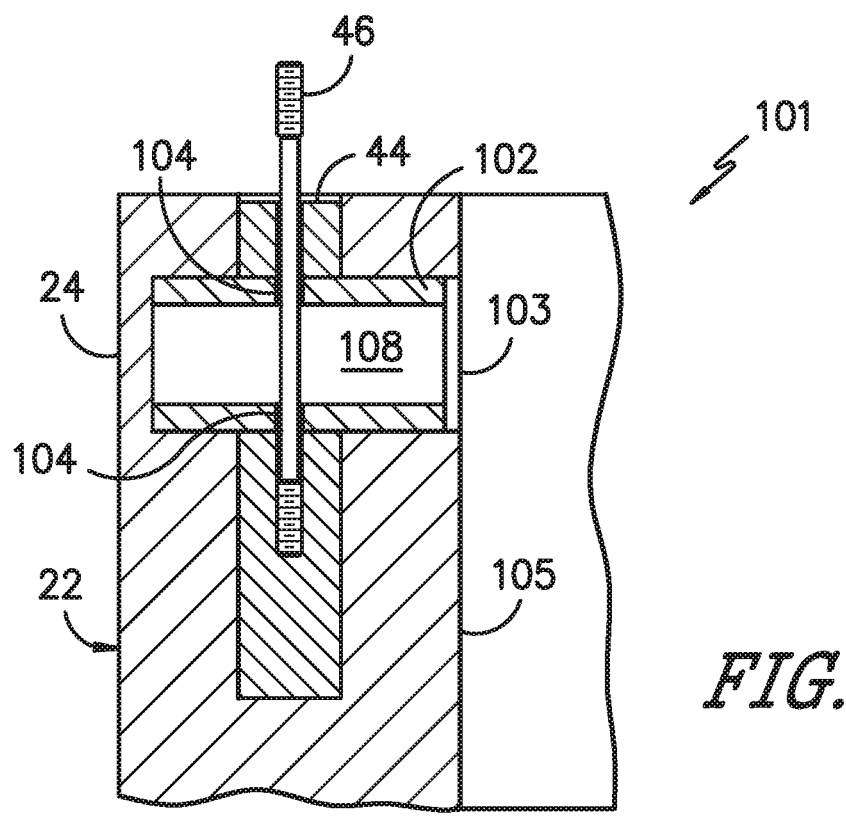
FIG. -6-
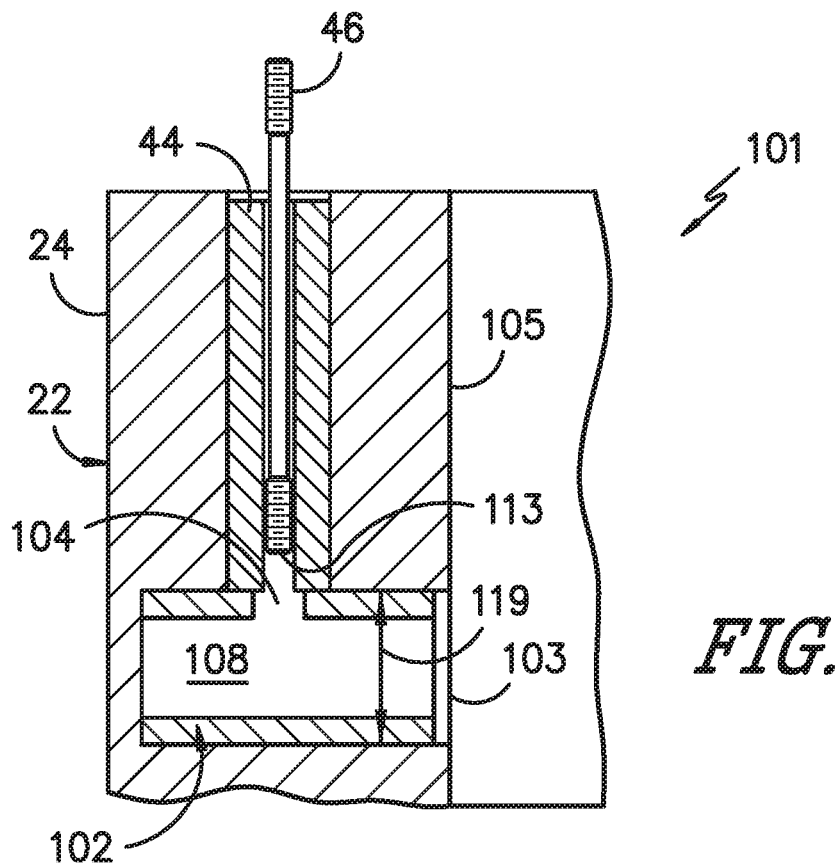
FIG. -7-

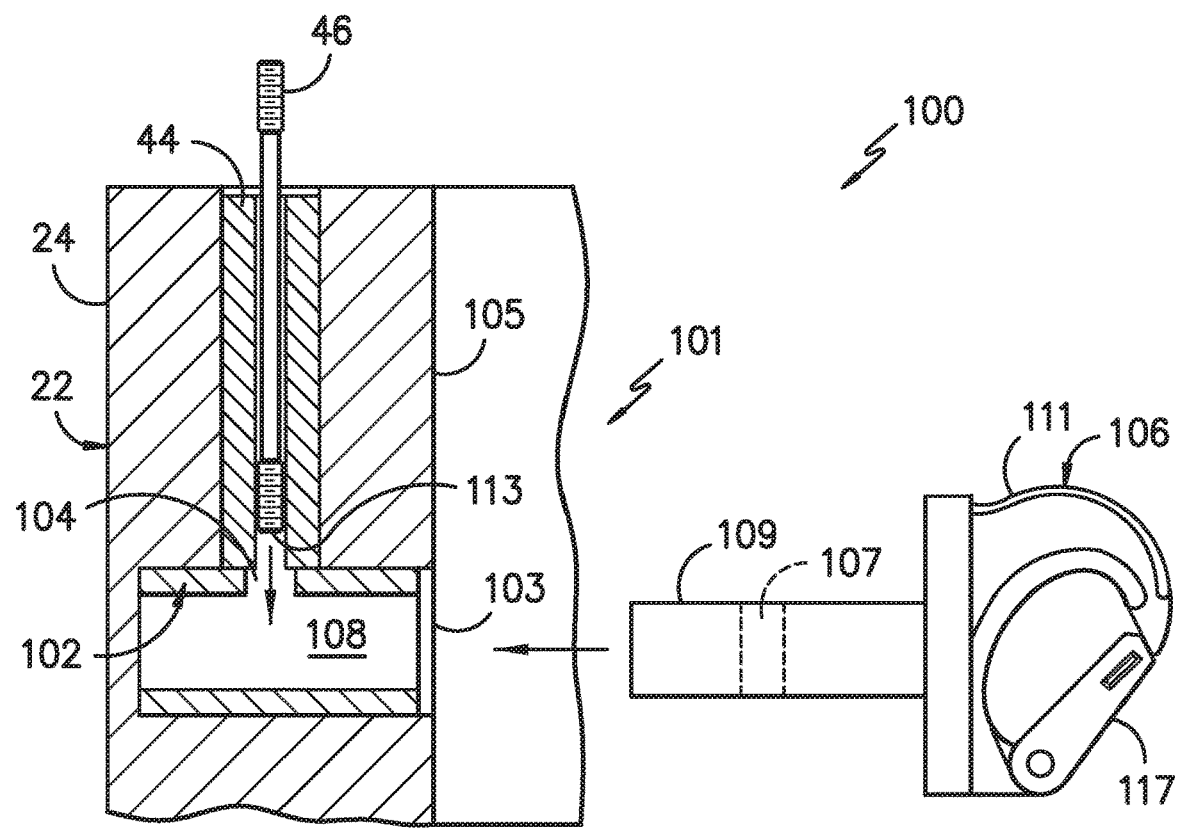
FIG. -8-
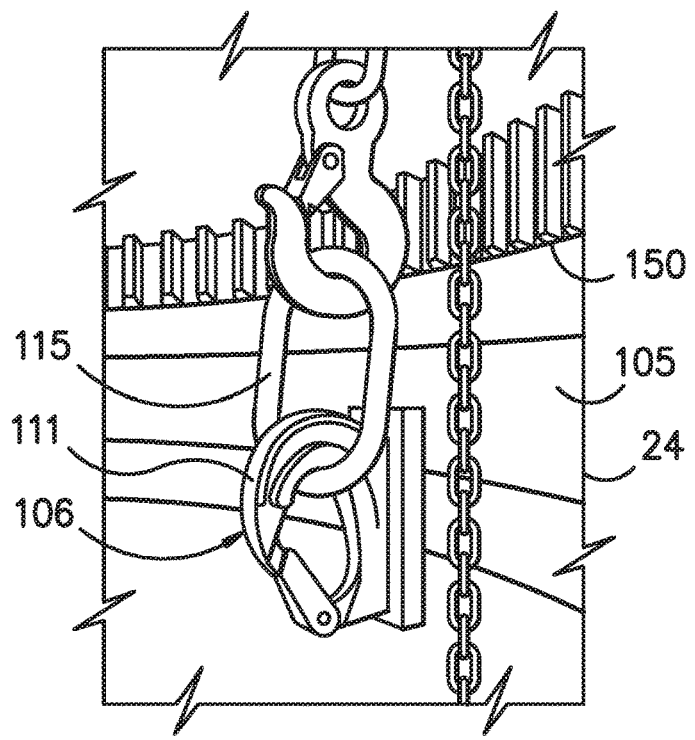
FIG. -9-

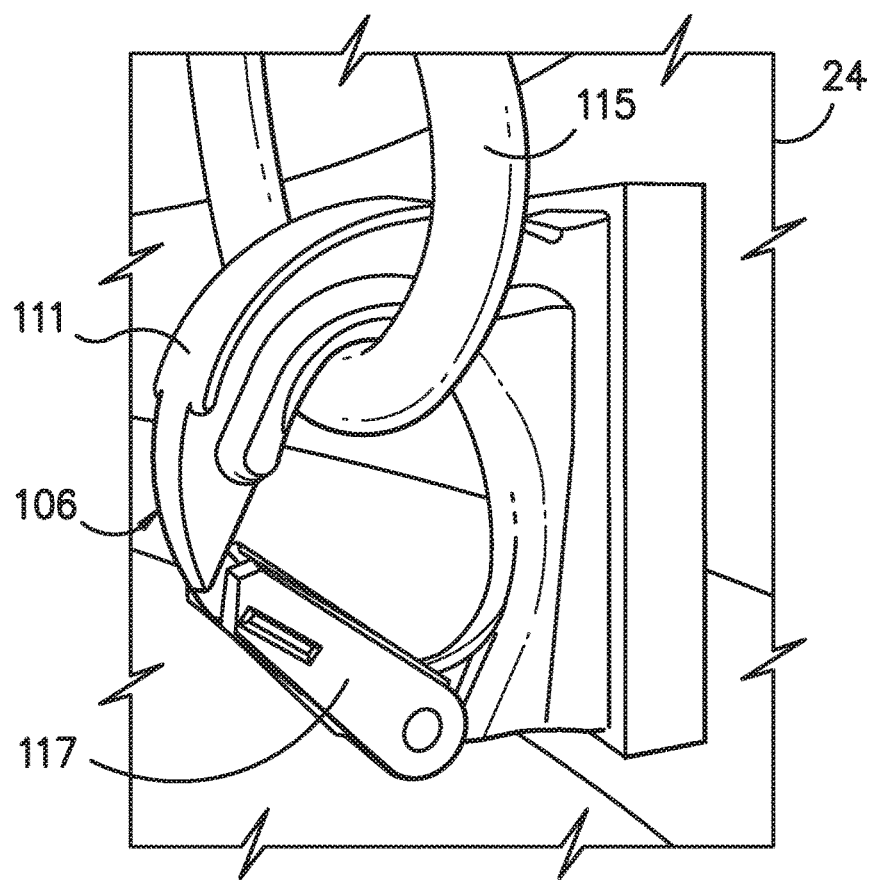
FIG. -10-
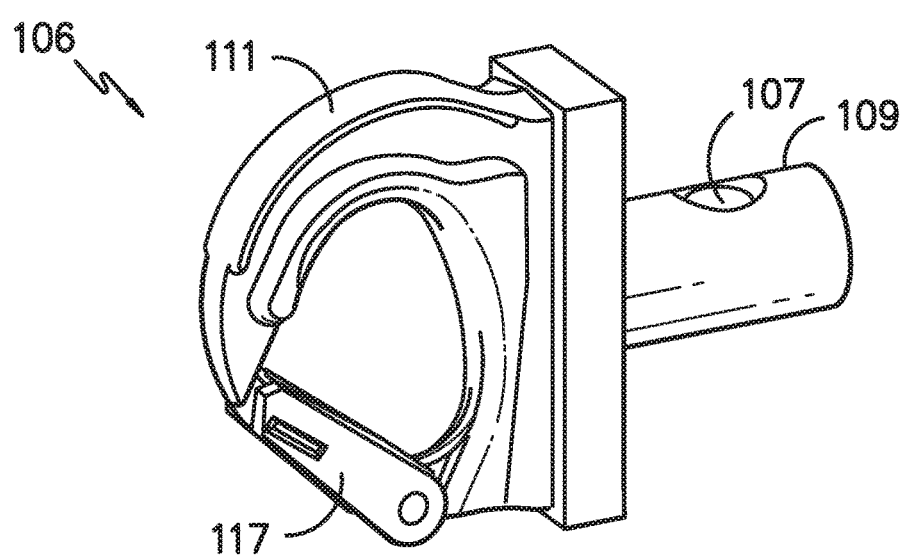
FIG. -11-

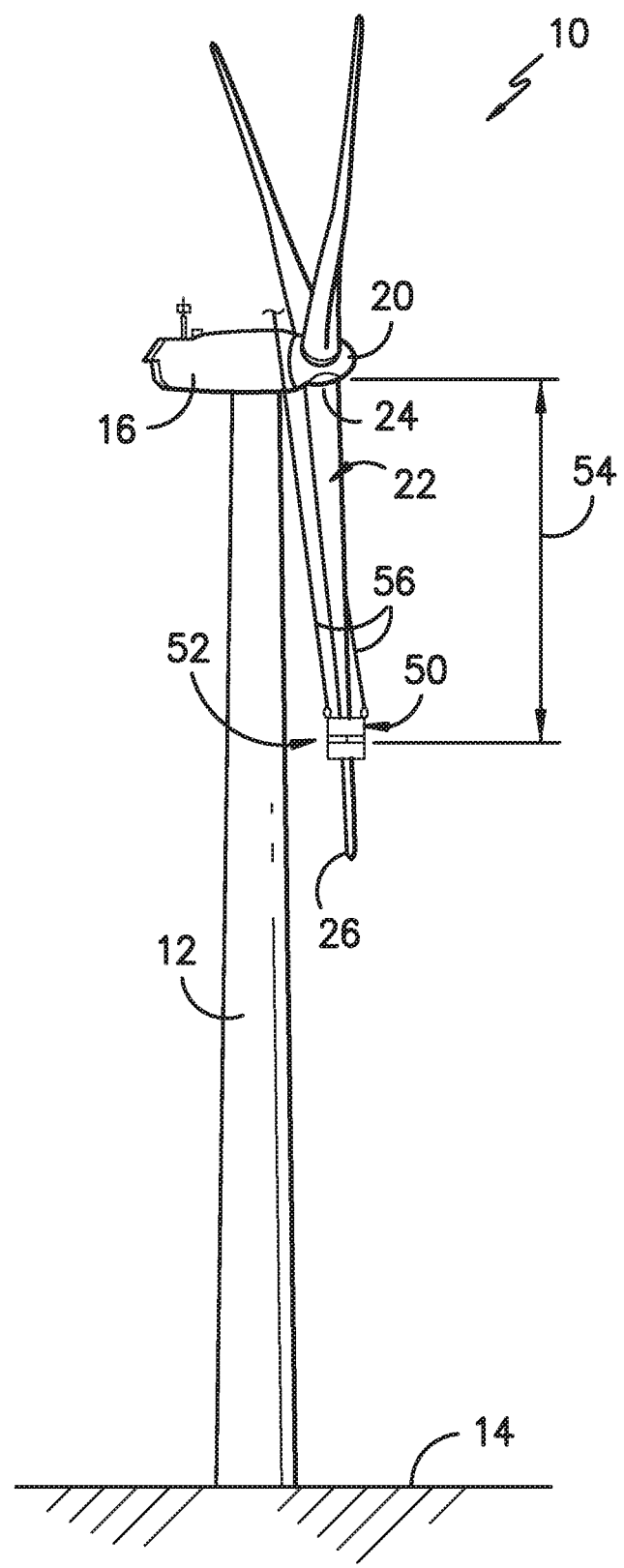
FIG. -12-

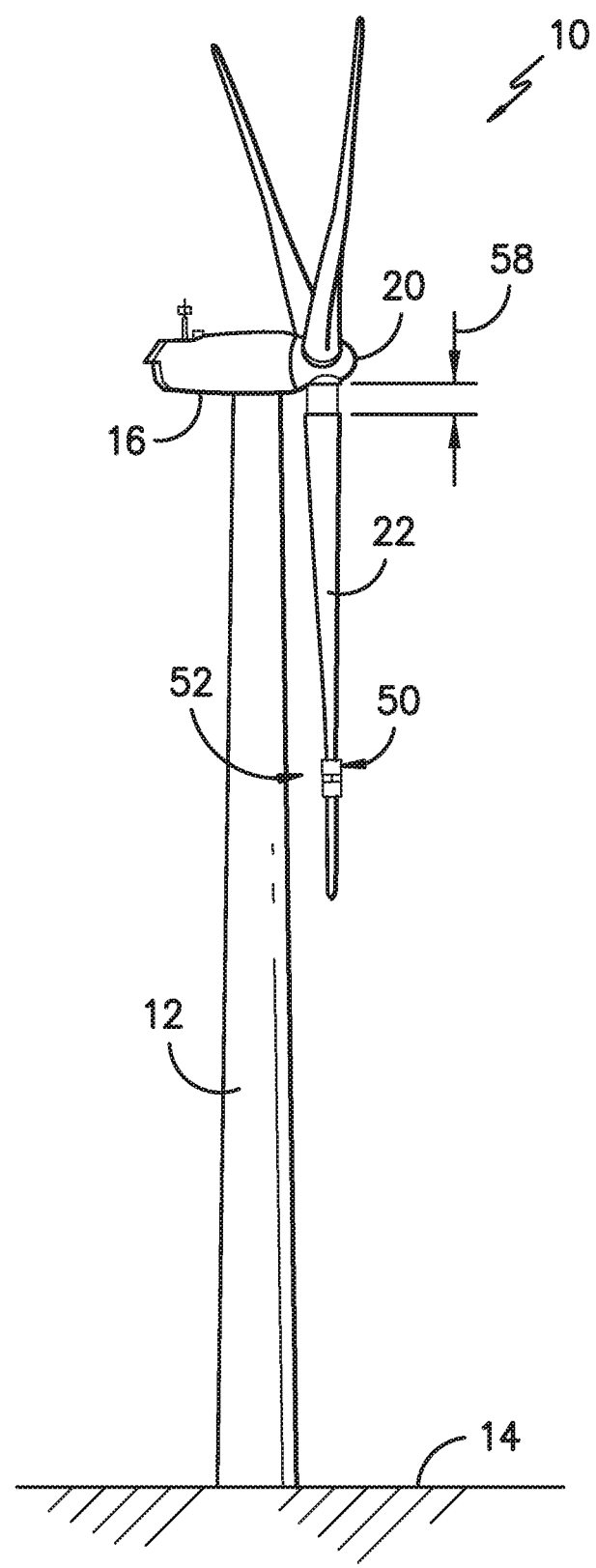
FIG. -13-

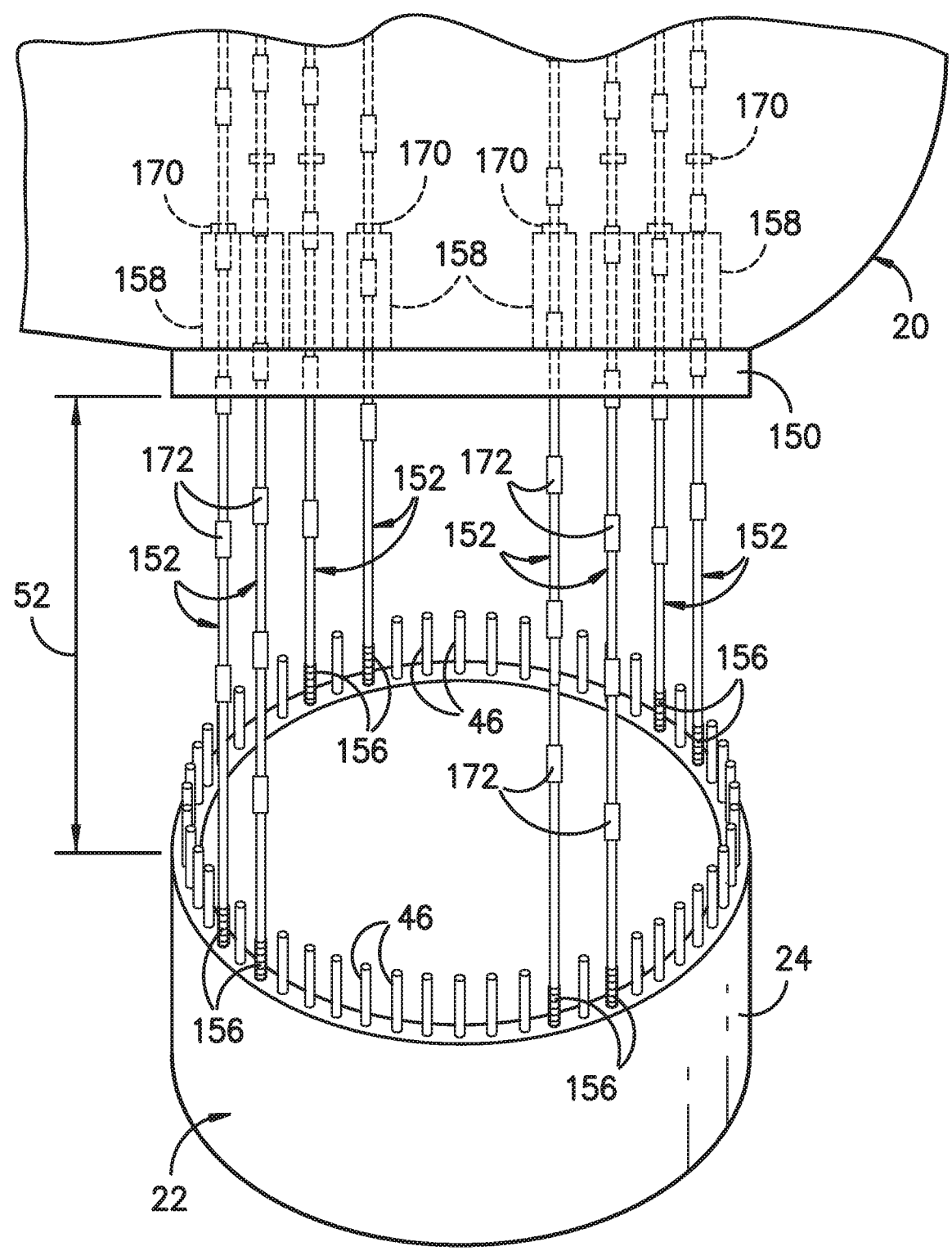
FIG. -14-

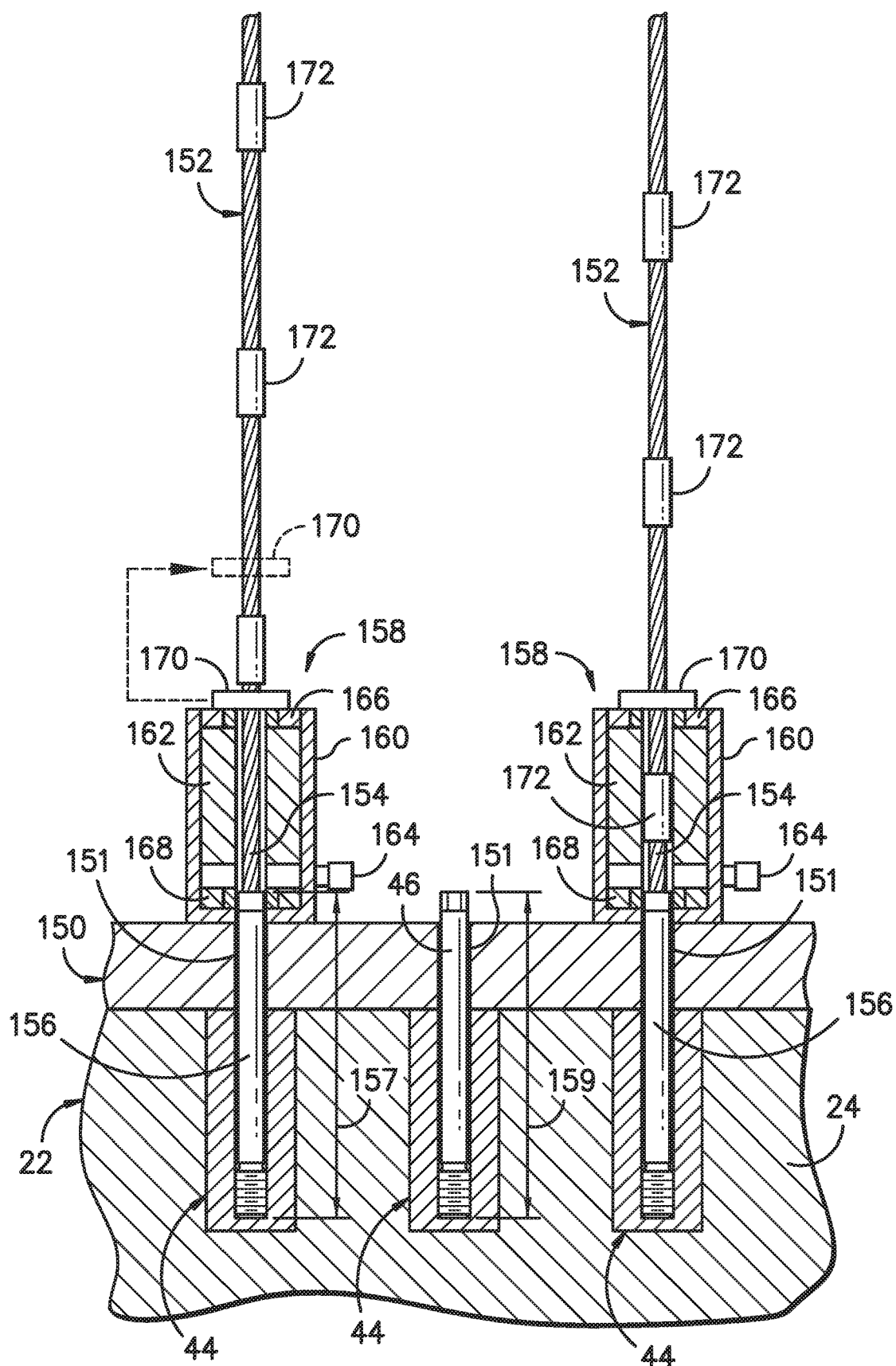
FIG. -15-

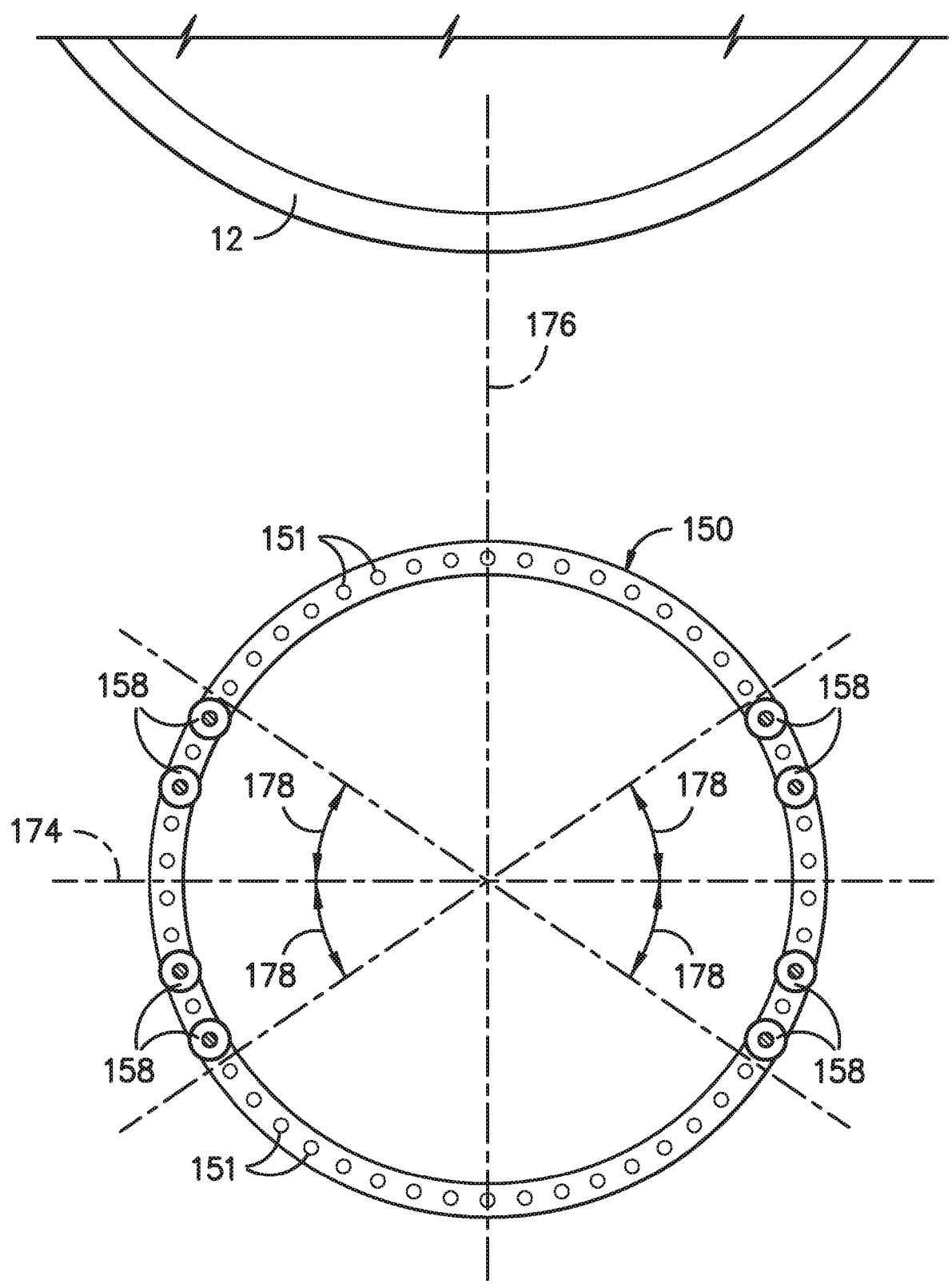
FIG. -16-

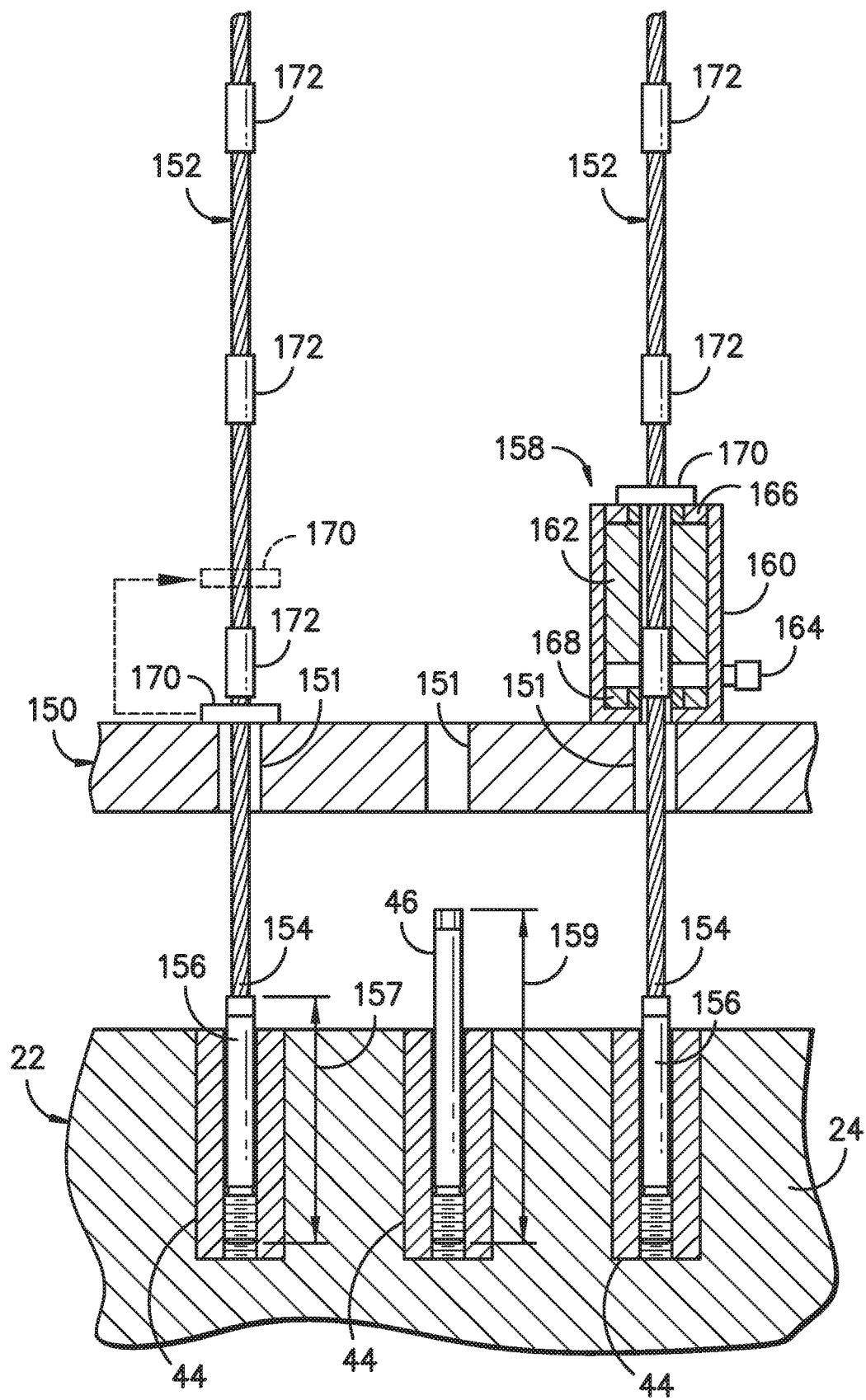
FIG. -17-

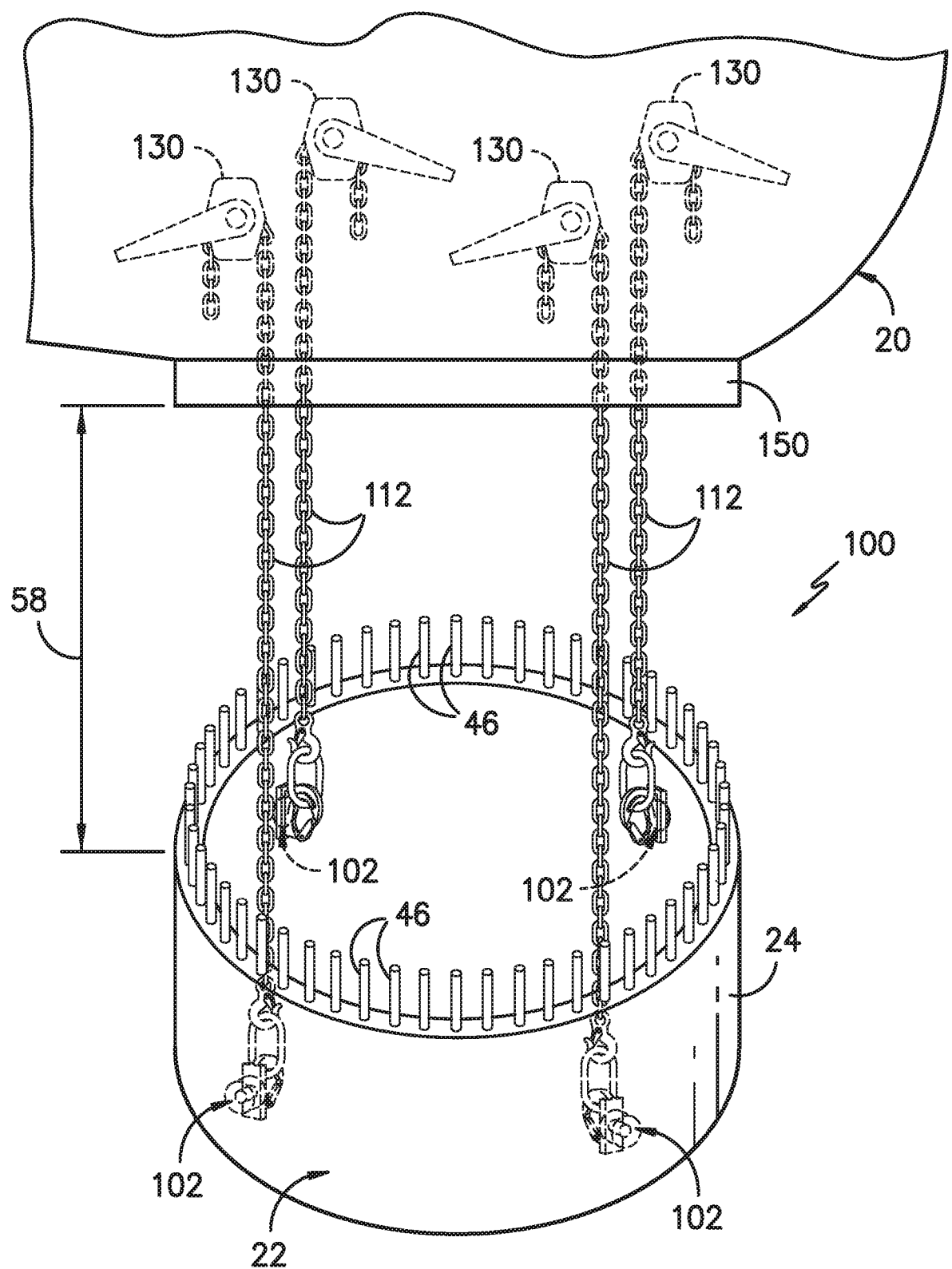
FIG. -18-

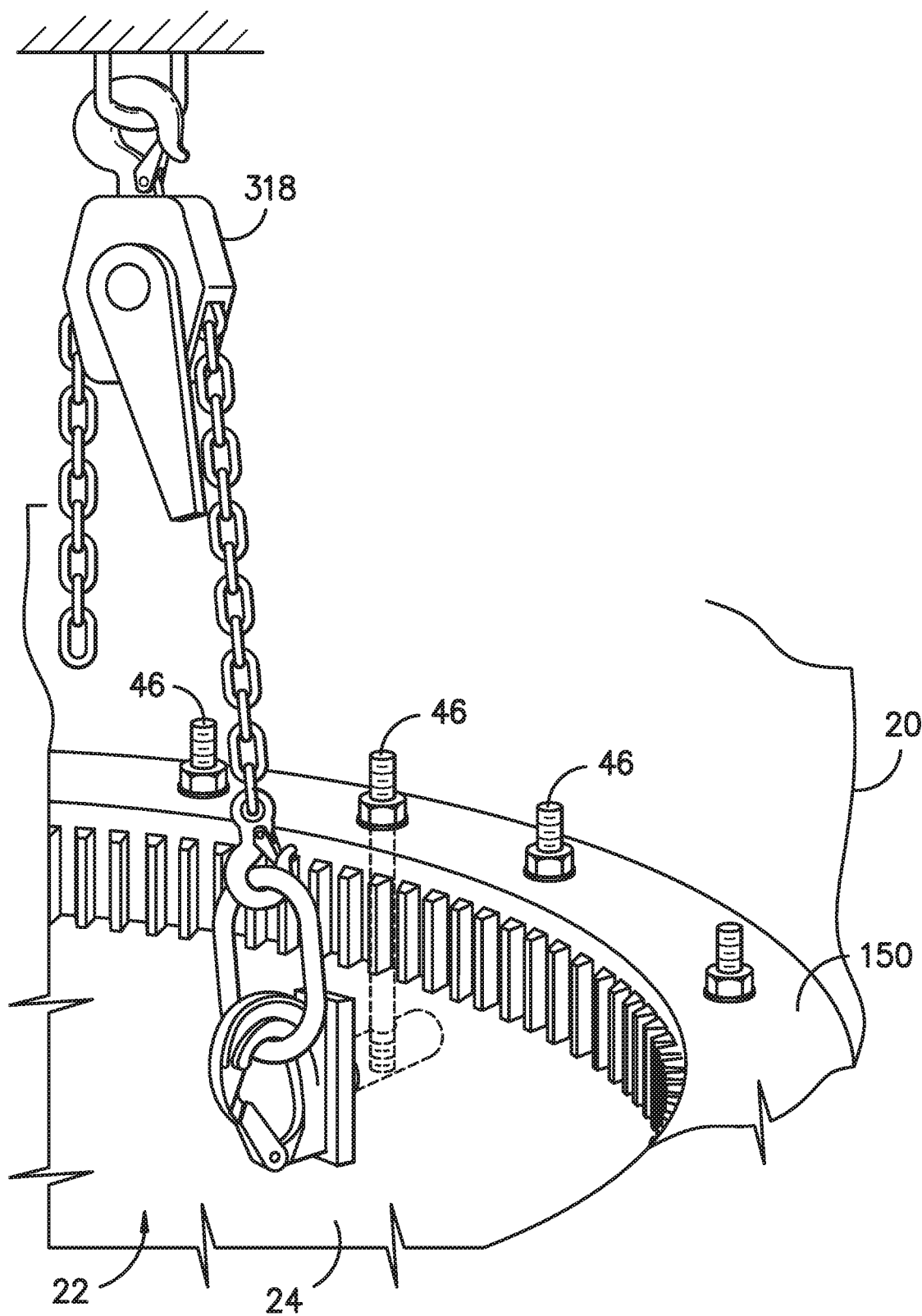
FIG. -19-

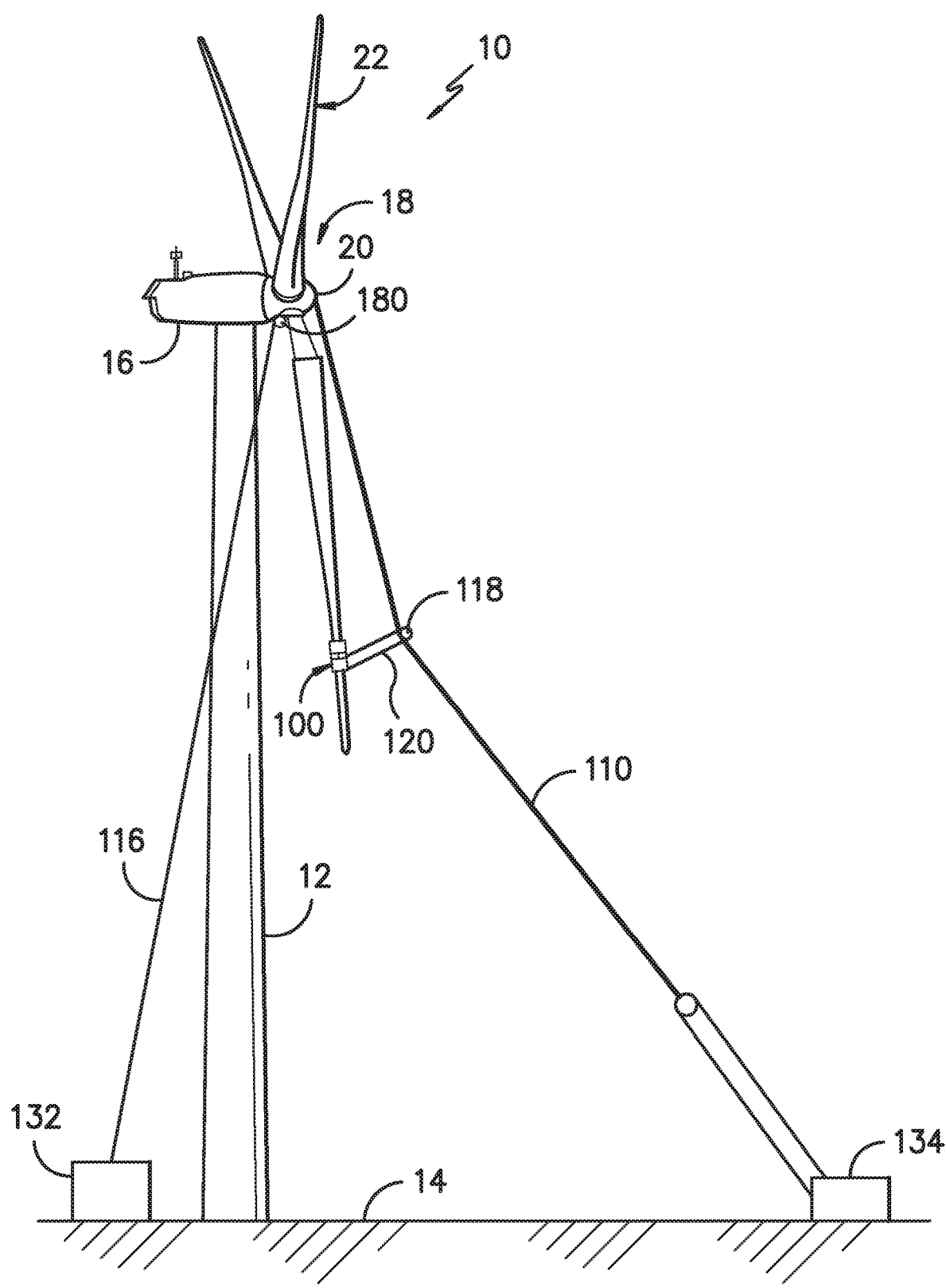
FIG. -20-

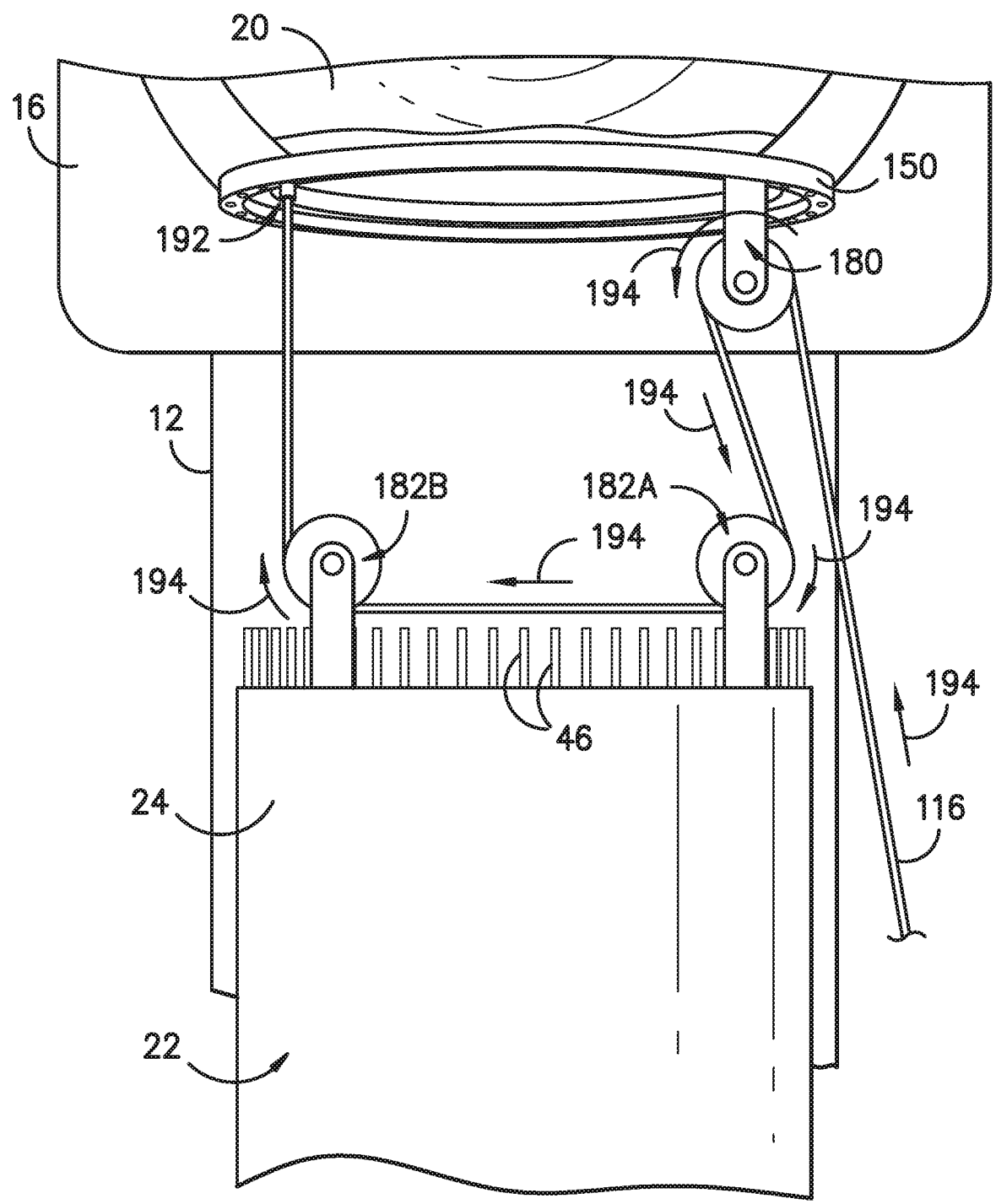
FIG. -21-

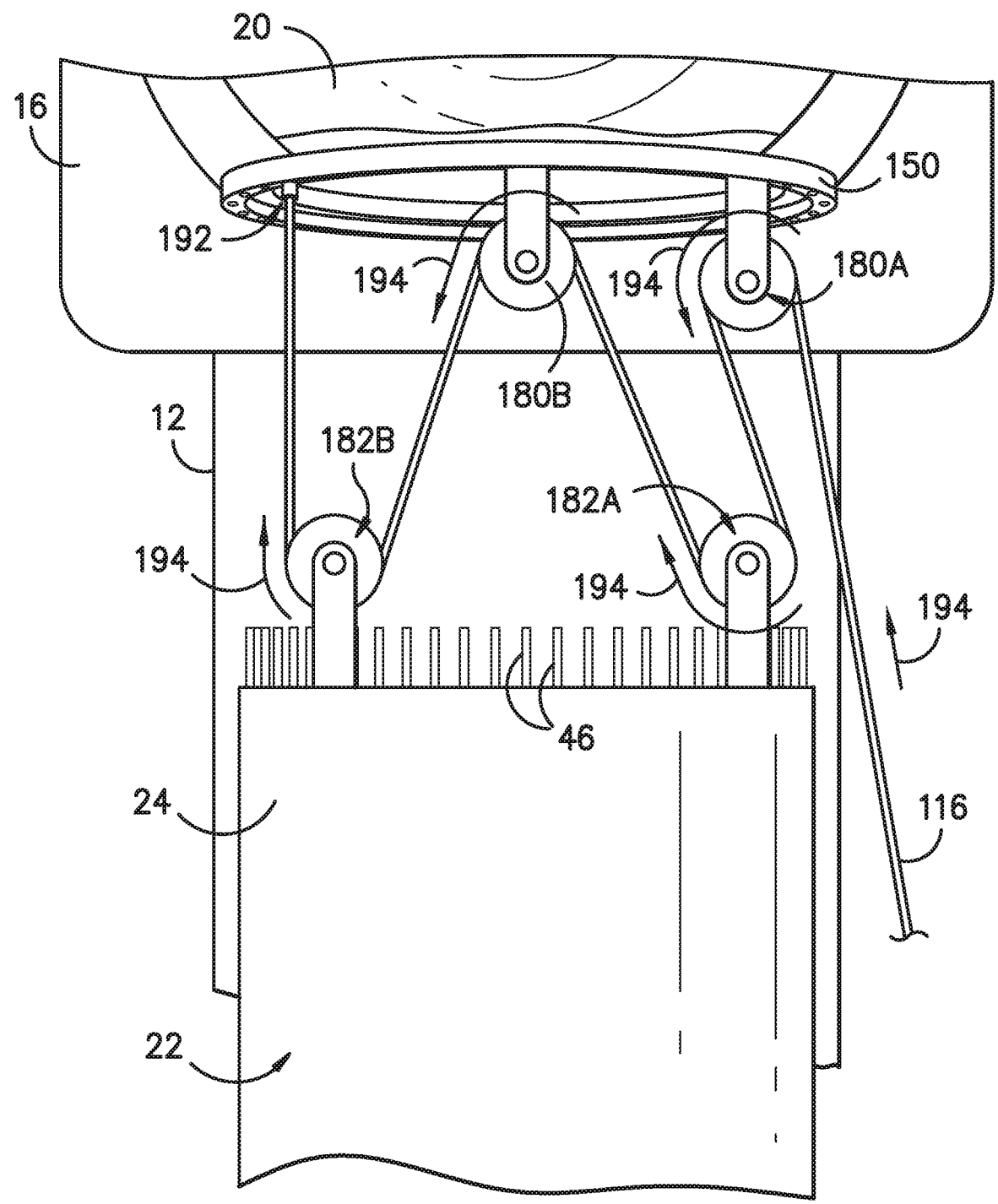
FIG. -22-

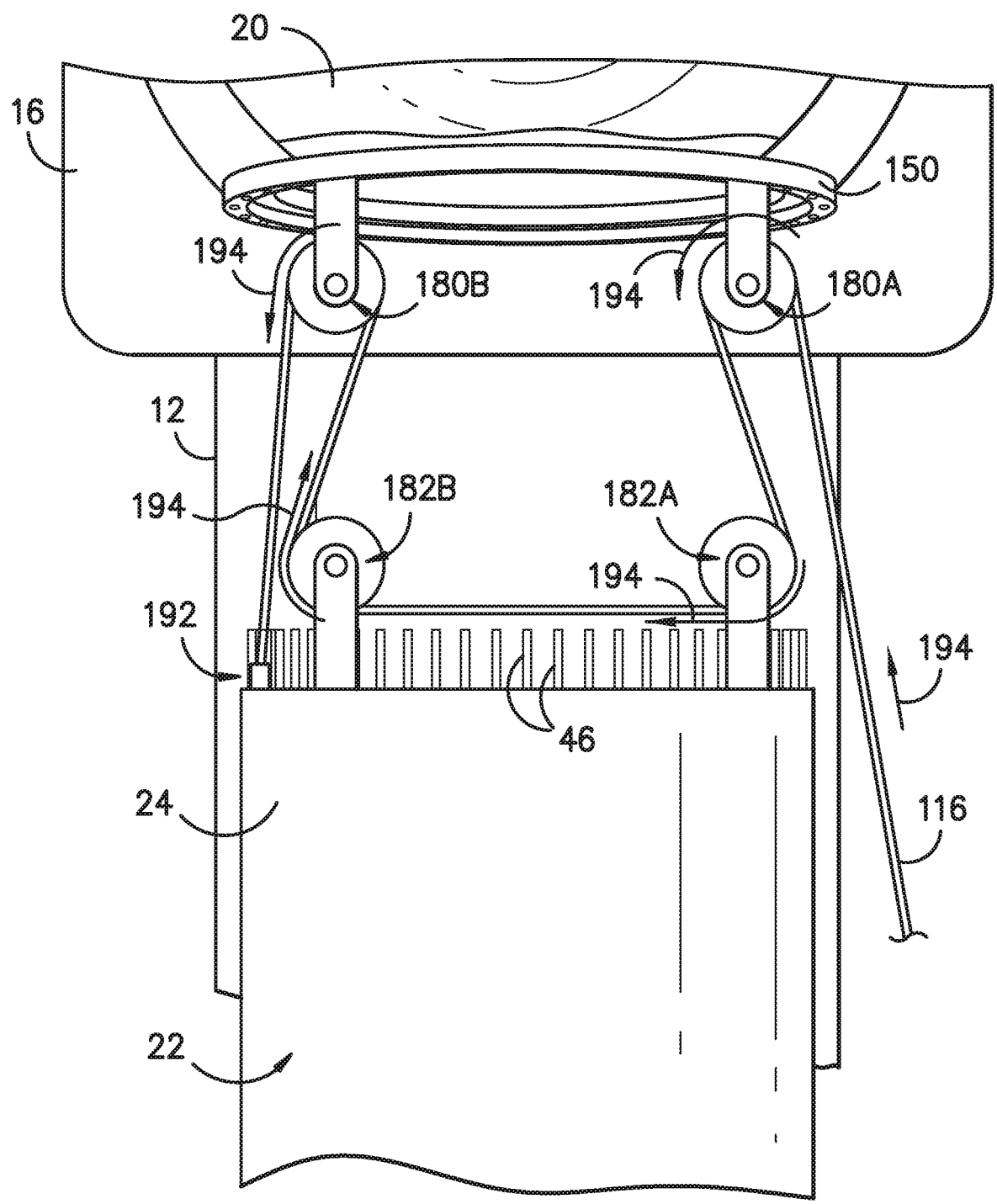
FIG. -23-

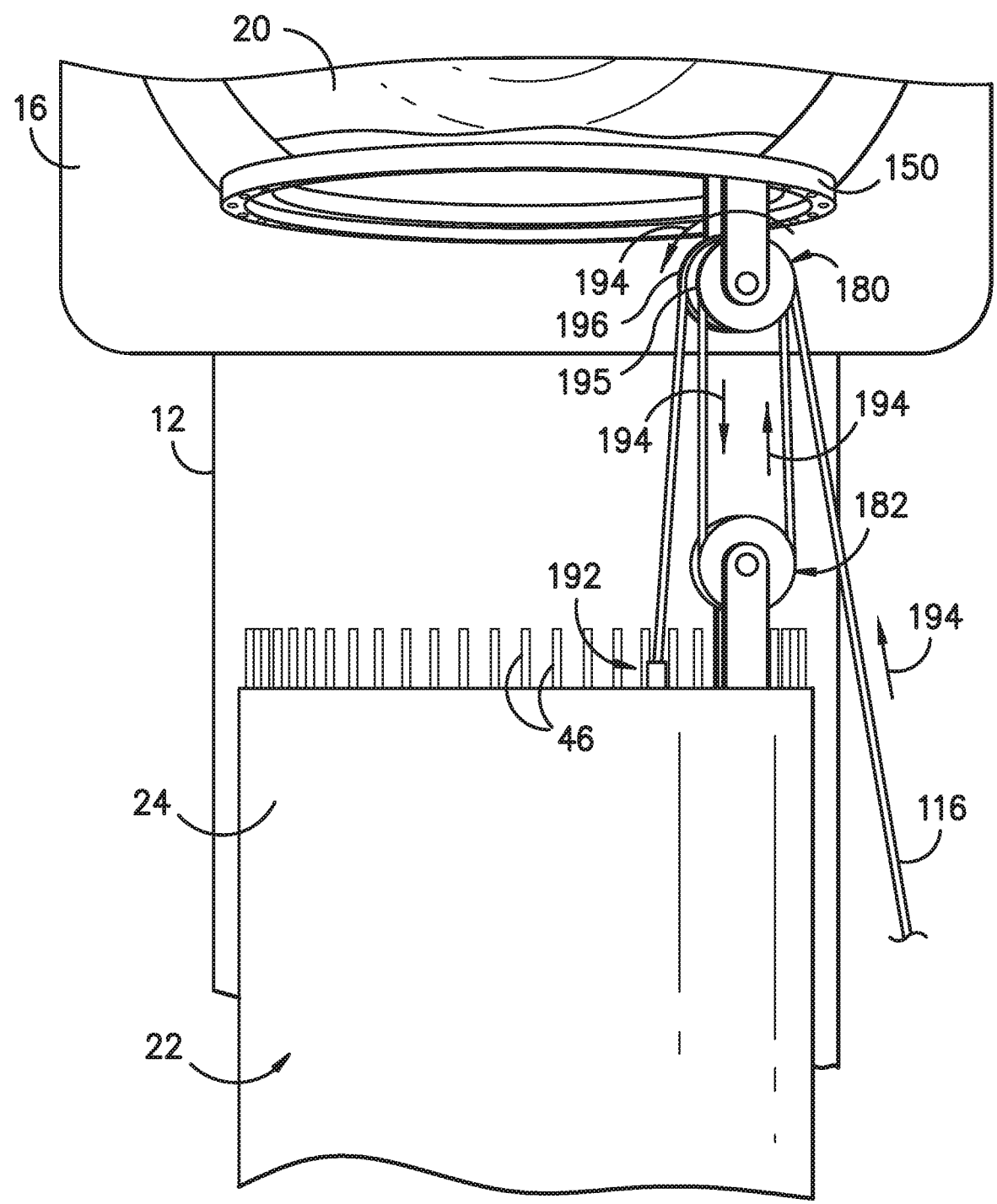
FIG. -24-

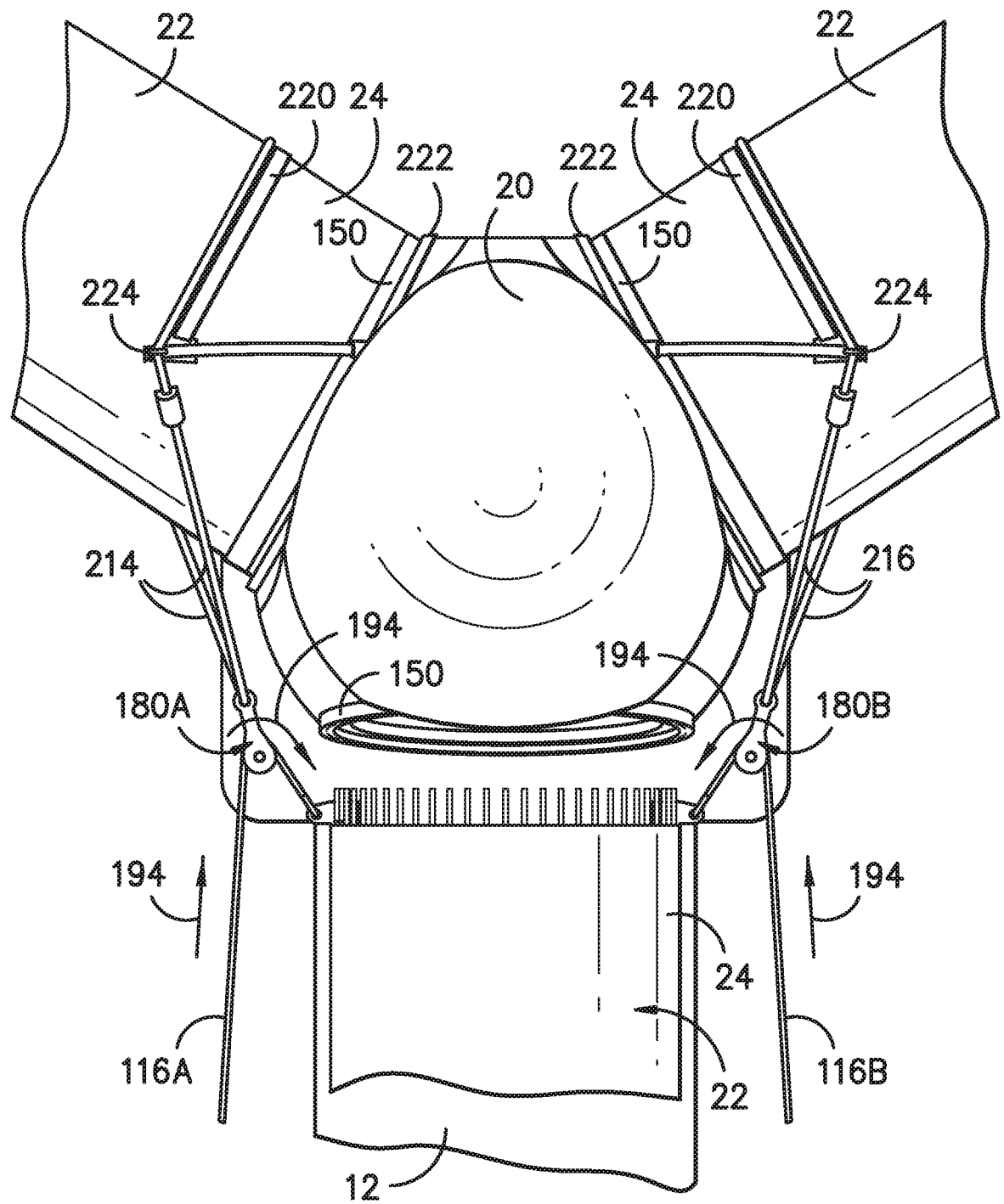
FIG. -25-

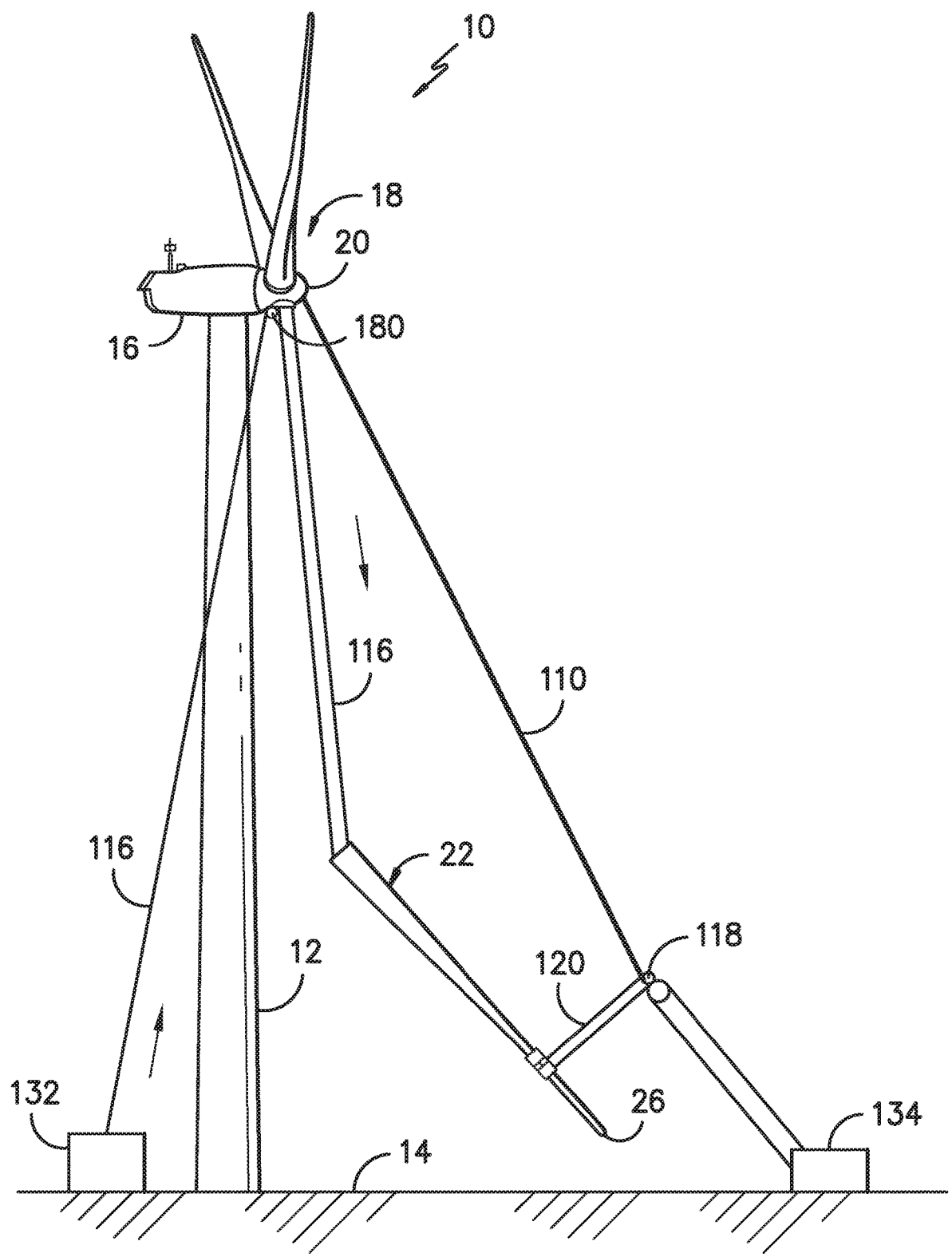
FIG. -26-

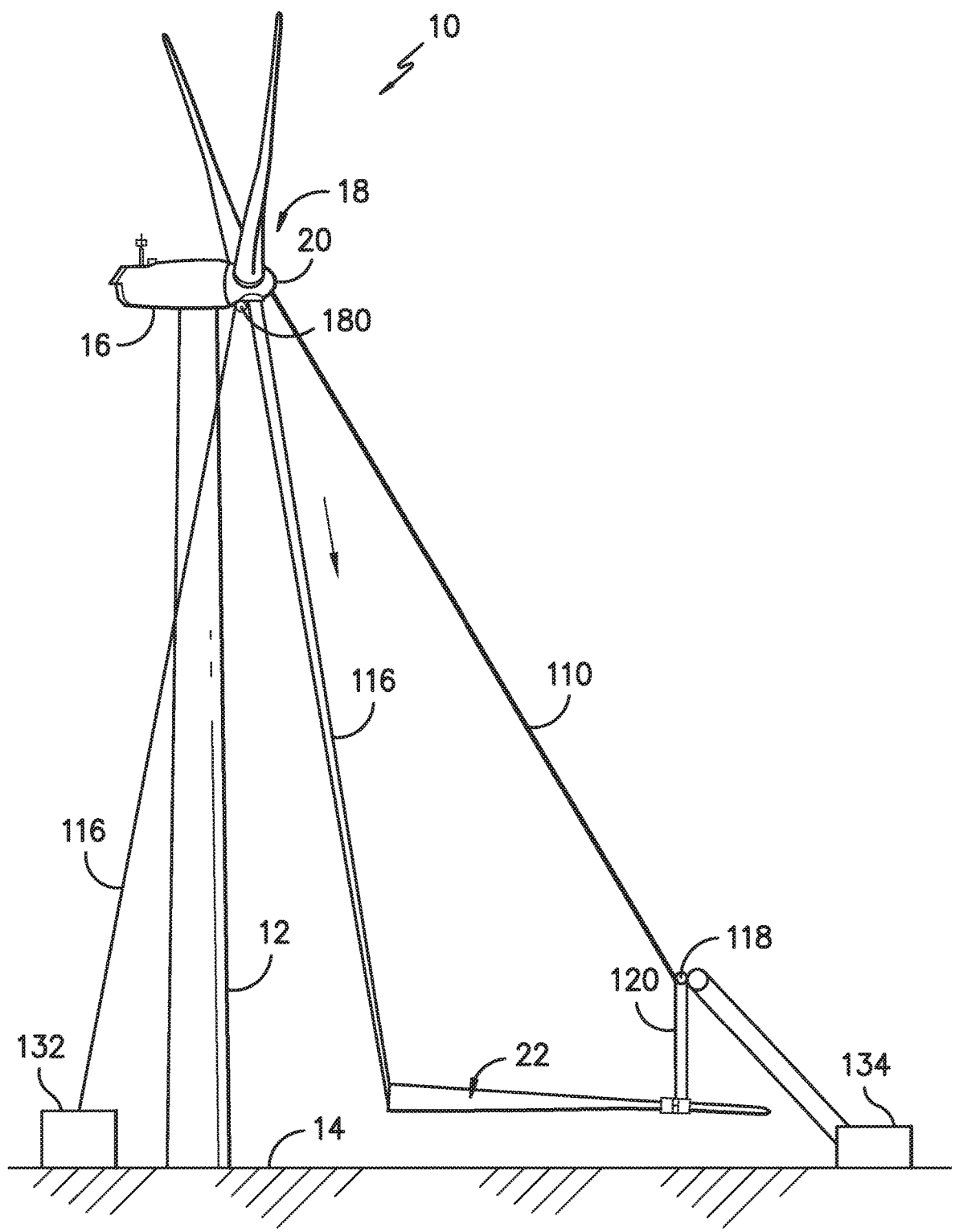
FIG. -27-

SYSTEM AND METHOD FOR MANUFACTURING WIND TURBINE ROTOR BLADES FOR SIMPLIFIED INSTALLATION AND REMOVAL

RELATED APPLICATIONS

This application claims the benefit of priority from and is a division of U.S. application Ser. No. 14/919,811 filed on Oct. 22, 2015, which is incorporated by reference herein in its entirety.

FIELD

The present disclosure relates generally to wind turbines, and more particularly to systems and methods for manufacturing wind turbine rotor blades that can be easily removed and/or installed atop a wind turbine tower.

BACKGROUND

Wind power is considered one of the cleanest, most environmentally friendly energy sources presently available, and wind turbines have gained increased attention in this regard. A modern wind turbine typically includes a tower, a generator, a gearbox, a nacelle, and one or more rotor blades. The rotor blades capture kinetic energy of wind using known airfoil principles. The rotor blades transmit the kinetic energy in the form of rotational energy so as to turn a shaft coupling the rotor blades to a gearbox, or if a gearbox is not used, directly to the generator. The generator then converts the mechanical energy to electrical energy that may be deployed to a utility grid.

Typically, to initially install a rotor blade onto the hub and/or to remove one of the existing rotor blades from the hub, a significantly large crane must be transported to the wind turbine site in order to provide a means for raising and/or lowering the rotor blade relative to the hub. Unfortunately, it is often extremely expensive to both transport the crane to the wind turbine site and operate the crane for the amount of time necessary to install and/or remove the rotor blade(s). As a result, the costs of employing such large cranes currently accounts for a significant portion of the overall costs associated with initial wind turbine installations and rotor blade maintenance operations.

In addition, the rotor blades are typically attached to an inner race of a pitch bearing via a plurality of root bolts. The root bolts are commonly threaded into a barrel nut located in the blade root. The barrel nut is essentially a short round bar that has a threaded hole perpendicular to the longitudinal axis of the barrel nut at a substantially center location thereof. Thus, certain methods for lifting and/or lowering a wind turbine rotor blade may include replacing a plurality of the barrel nuts in the blade root of the rotor blade with lifting hardware that allows the rotor blade to be lifted and/or lowered from inside of the hub without using a crane.

Certain rotor blades, however, do not utilize barrel nuts within the blade root. Thus, previously discussed lifting and/or lowering methods cannot be easily utilized. Accordingly, the art is continuously seeking systems and methods for manufacturing rotor blades that provide blades that can be easily removed and/or installed without the use of a significantly large crane.

BRIEF DESCRIPTION

Aspects and advantages of the invention will be set forth in part in the following description, or may be obvious from the description, or may be learned through practice of the invention.

In one aspect, the present disclosure is directed to a method for manufacturing a rotor blade of a wind turbine that can be easily lifted and lowered to and from a rotor installed atop a tower. The method includes providing a plurality of root inserts for a blade root of the rotor blade and securing at least one cylindrical member to one of the plurality of root inserts such that the cylindrical member is substantially perpendicular with the root inserts. The method also includes arranging the plurality of root inserts in a blade mold of the rotor blade. Further, the method includes forming a blade shell of the rotor blade with the plurality of root inserts laminated therein.

In one embodiment, the cylindrical member(s) may include one or more openings configured to receive a root bolt. Thus, the method may also include inserting the root bolt through the openings of each of the cylindrical members.

In another embodiment, the method may include securing at least one attachment component within each of the cylindrical members. Thus, the attachment component(s) provide an attachment location for a pulley cable used to lift and lower the rotor blade to and from the rotor installed atop the tower. More specifically, in certain embodiments, the attachment component(s) include a barrel nut component and a hook component. Thus, the method may also include inserting the root bolt through the barrel nut component.

In additional embodiments, the step of securing the attachment component(s) within each of the cylindrical members may include inserting the barrel nut component of the attachment component within the cylindrical member and securing a first end of at least one of the root bolts within the barrel nut component.

In further embodiments, the step of securing the cylindrical member(s) to one or more of the plurality of root inserts may include welding the cylindrical member to one of the plurality of root inserts.

In yet another embodiment, the method may include securing the cylindrical member(s) to one or more of the plurality of root inserts such that the cylindrical member intersects the root insert. Alternatively, the method may include securing the cylindrical member(s) to a first end of one or more of the plurality of root inserts, wherein an outer diameter of the at least one cylindrical member is adjacent to the first end of the root insert but does not intersect the root insert.

In another aspect, the present disclosure is directed to a method for retrofitting a rotor blade for lifting and/or lowering to and from a rotor installed atop a tower. Such rotor blade includes a blade root with a plurality of circumferentially-spaced root bolts. In addition, each of the root bolts is secured within a tubular root insert located in the blade root. Thus, the method includes installing at least one lifting device within the blade root. More specifically, each of the lifting devices includes a cylindrical member and a corresponding attachment component. Accordingly, the step of installing the lifting device(s) further includes installing the cylindrical member within the blade root such that the cylindrical member is substantially perpendicular with one of the root inserts. The method may also include securing the attachment component within the cylindrical member. Thus, the attachment component provides an attachment location for a pulley cable used to lift and lower the rotor blade to and from the rotor installed atop the tower.

In one embodiment, the step of installing the cylindrical member within the blade root such that the cylindrical member is substantially perpendicular with the root insert may include machining an opening in an interior wall of the blade root of the rotor blade and inserting the cylindrical member in the opening. For example, in certain embodiments, the method may include machining the opening adjacent to the root insert. Thus, in certain embodiments, an outer diameter of the cylindrical member may be adjacent to a first end of one of the root inserts. Accordingly, in such embodiments, the cylindrical member may not intersect the root insert. Alternatively, the method may include machining the opening through one of the root inserts such that the cylindrical member extends through and/or intersects the root insert.

In additional embodiments, the method may include securing the cylindrical member to the root insert. For example, in one embodiment, the step of securing the cylindrical member to the root insert may include welding the cylindrical member to the root insert.

In additional embodiments, the attachment component may include a barrel nut component and a hook component. Thus, in one embodiment, the method may include attaching at least one pulley cable to the hook component of the attachment component such that the rotor blade may be lifted or lowered via the pulley cable(s), e.g. via coordinated winch operation.

In yet another embodiment, the step of securing the attachment component within the cylindrical member of the blade root may include inserting the barrel nut component of the attachment component within one of the cylindrical member and securing a first end of one of the root bolts within the barrel nut component.

In yet another aspect, the present disclosure is directed to system for retrofitting a rotor blade for lifting and removing to and from a rotor installed atop a wind turbine tower. The rotor blade includes a blade root with a plurality of circumferentially-spaced root bolts. In addition, each of the root bolts is secured within a tubular root insert located in the blade root. The system includes a plurality of lifting devices. Each of the lifting devices includes a plurality of cylindrical members configured to align substantially perpendicular with one of the root inserts within the blade root. Further, the cylindrical members each include at least one opening configured to receive one of the root bolts. The lifting devices also include a plurality of attachment components configured to fit at least partially within an open passageway of the cylindrical members. Moreover, the attachment components each include a corresponding threaded opening that aligns with the opening of the cylindrical members such that one of the root bolts can extend through the aligned openings of the cylindrical member and the attachment component. Thus, the attachment components provide one or more attachment locations for a plurality of pulley cables that can be used to lift and lower the rotor blade to and from the rotor installed atop the tower.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 1 illustrates a perspective view of a wind turbine according to one embodiment of the present disclosure;

FIG. 2 illustrates a perspective view of a rotor blade according to one embodiment of the present disclosure;

FIG. 3 illustrates a cross-sectional view of one embodiment of a root attachment assembly for the rotor blade of FIG. 2;

FIG. 4 illustrates a flow diagram of one embodiment of a method for retrofitting a rotor blade for lifting and/or lowering to and from a rotor installed atop a tower according to the present disclosure;

FIG. 5 illustrates a flow diagram of one embodiment of a method for manufacturing a rotor blade of a wind turbine that can be easily lifted and lowered to and from a rotor installed atop a tower according to the present disclosure.

FIG. 6 illustrates a cross-sectional view of one embodiment of various components of a lifting device according to the present disclosure, particularly illustrating a cylindrical member of the lifting device configured through a root insert;

FIG. 7 illustrates a cross-sectional view of one embodiment of various components of a lifting device according to the present disclosure, particularly illustrating a cylindrical member of the lifting device configured adjacent to a root insert;

FIG. 8 illustrates a cross-sectional view of the lifting device of FIG. 7, particularly illustrating an attachment component of the lifting device aligned with an open passageway of the cylindrical member;

FIG. 9 illustrates an internal, perspective view of one embodiment of a lifting device installed within an interior wall of the blade root according to the present disclosure;

FIG. 10 illustrates a detailed view of the lifting device of FIG. 9;

FIG. 11 illustrates a perspective view of one embodiment of an attachment component of a lifting device according to the present disclosure;

FIG. 12 illustrates another perspective view of the wind turbine shown in FIG. 1, particularly illustrating a rotor blade to be lowered from the wind turbine positioned in a generally vertical orientation relative to a support surface of the wind turbine and a blade sock installed onto the rotor blade;

FIG. 13 illustrates another perspective view of the wind turbine shown in FIG. 12, particularly illustrating the rotor blade lowered to an initial vertical height and a blade support installed onto the rotor blade;

FIG. 14 illustrates a close-up, partial perspective view of the rotor blade and the hub, particularly illustrating one embodiment of a lowering system including support cables secured to the rotor blade and extending through both a pitch bearing of the wind turbine and corresponding cable translation devices positioned within the hub;

FIG. 15 illustrates a cross-sectional view of the rotor blade and the pitch bearing shown in FIG. 14 prior to the rotor blade being lowered from the hub, particularly illustrating a pair of the support cables and cable translation devices of the lowering system;

FIG. 16 illustrates a top-down view of the pitch bearing shown in FIG. 15, particularly illustrating the circumferentially positioning of the cable translation devices around the pitch bearing relative to a tower reference line extending radially from the center of the wind turbine tower through the center of the pitch bearing;

FIG. 17 illustrates a similar cross-sectional view to that shown in FIG. 16, particularly illustrating a variation of the blade lowering system shown in FIG. 16 in which each pair of support cables secured to the rotor blade includes one support cable in operative association with a corresponding cable transition device and another support cable extending through the pitch bearing without being received within a cable translation device;

FIG. 18 illustrates a close-up, partial perspective view of the rotor blade and the hub shown in FIG. 14, particularly illustrating another embodiment of a lowering system including support cables secured to the rotor blade and corresponding cable translation devices positioned within the hub;

FIG. 19 illustrates a close-up, partial perspective view of the interface between the rotor blade and the pitch bearing shown in FIG. 18 prior to the rotor blade being lowered from the hub, particularly illustrating a support cable coupled between a support nut installed within the blade root and a corresponding cable translation device positioned within the hub;

FIG. 20 illustrates another perspective view of the wind turbine shown in FIG. 12, particularly illustrating a pulley cable coupled between the rotor blade and a first winch via one or more up-tower pulleys and a guide line having a guide pulley mounted thereto, wherein the guide line is mounted between the rotor and a second winch;

FIG. 21 illustrates one embodiment of a pulley arrangement that may be utilized to lower the rotor blade relative to the hub according to the present disclosure;

FIG. 22 illustrates another embodiment of a pulley arrangement that may be utilized to lower the rotor blade relative to the hub according to the present disclosure;

FIG. 23 illustrates a further embodiment of a pulley arrangement that may be utilized to lower the rotor blade relative to the hub according to the present disclosure;

FIG. 24 illustrates yet another embodiment of a pulley arrangement that may be utilized to lower the rotor blade relative to the hub according to the present disclosure;

FIG. 25 illustrates an even further example of a pulley arrangement that may be utilized to lower the rotor blade relative to the hub according to the present disclosure;

FIG. 26 illustrates another perspective view of the wind turbine shown in FIG. 20, particularly illustrating the rotor blade being rotated to a horizontal position as the blade is being lowered via the pulley cable and the guide cable of the guide line; and FIG. 27 illustrates another perspective view of the wind turbine shown in FIG. 19, particularly illustrating the rotor blade being held in a substantially horizontal position.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Generally, the present subject matter is directed to systems and methods for manufacturing a wind turbine rotor blade that can be easily lifted and lowered to and from a rotor installed atop a tower. The method includes providing a plurality of root inserts for a blade root of the blade and securing at least one cylindrical member to one of the root inserts such that the cylindrical member is substantially perpendicular with the root insert. The method also includes arranging the root inserts in a blade mold of the blade and forming a blade shell with the plurality of root inserts laminated therein. The method may further include securing at least one attachment component within each of the cylindrical members so as to provide an attachment location for a pulley cable used to lift and lower the rotor blade to and from the rotor installed atop the tower.

More specifically, in one embodiment, the present disclosure is directed to systems and methods for retrofitting rotor blades to be easily lifted and/or lowered to and from a rotor installed atop a tower. The rotor blade generally includes a blade root with a plurality of circumferentially-spaced root bolts. In addition, each of the root bolts is secured within a tubular root insert located in the blade root. Thus, the system and method as described herein is particularly useful for rotor blades that do not use barrel nuts to secure the root bolts within the blade root. Accordingly, the method includes installing at least one lifting device within the blade root. More specifically, each of the lifting devices includes a cylindrical member and a corresponding attachment component. Thus, the step of installing the lifting device(s) further includes installing the cylindrical member within the blade root such that the cylindrical member is substantially perpendicular with one of the root inserts. The method also includes securing the attachment component within the installed cylindrical member. Thus, the attachment component provides an attachment location for a pulley cable that can be used to lift and/or lower the rotor blade to and from the rotor installed atop the tower.

Referring now to the drawings, FIG. 1 illustrates a perspective view of one embodiment of a wind turbine 10. As shown, the wind turbine 10 generally includes a tower 12 extending from a support surface 14 (e.g., the ground, a concrete pad or any other suitable support surface). In addition, the wind turbine 10 may also include a nacelle 16 mounted on the tower 12 and a rotor 18 coupled to the nacelle 16. The rotor 18 includes a rotatable hub 20 and at least one rotor blade 22 coupled to and extending outwardly from the hub 20. For example, in the illustrated embodiment, the rotor 18 includes three rotor blades 22. However, in an alternative embodiment, the rotor 19 may include more or less than three rotor blades 22. Each rotor blade 22 may be spaced about the hub 20 to facilitate rotating the rotor 19 to enable kinetic energy to be transferred from the wind into usable mechanical energy, and subsequently, electrical energy. For instance, the hub 20 may be rotatably coupled to an electric generator (not shown) positioned within the nacelle 16 to permit electrical energy to be produced.

Referring now to FIG. 2, a perspective view of one of the rotor blades 22 shown in FIG. 1 is illustrated in accordance with aspects of the present subject matter. As shown, the rotor blade 22 includes a blade root 24 configured for mounting the rotor blade 22 to the hub 20 of a wind turbine 10 (FIG. 1) and a blade tip 26 disposed opposite the blade root 24. A body 28 of the rotor blade 22 may extend lengthwise between the blade root 24 and the blade tip 26 and may generally serve as the outer shell of the rotor blade 22. As is generally understood, the body 28 may define an aerodynamic profile (e.g., by defining an airfoil shaped cross-section, such as a symmetrical or cambered airfoil-shaped cross-section) to enable the rotor blade 22 to capture kinetic energy from the wind using known aerodynamic principles. Thus, the body 28 may generally include a pressure side 30 and a suction side 32 extending between a leading edge 34 and a trailing edge 36. Additionally, the rotor blade 22 may have a span 38 defining the total length of the body 28 between the blade root 24 and the blade tip 26 and a chord 40 defining the total length of the body 28 between the leading edge 34 and the trailing edge 36. As is generally understood, the chord 40 may vary in length with respect to the span 38 as the body 29 extends from the blade root 24 to the blade tip 26.

Moreover, as shown in FIGS. 2 and 3, the rotor blade 22 may also include a plurality of root attachment assemblies 42 for coupling the blade root 22 to the hub 20 of the wind turbine 10. In general, as shown in FIG. 3, each root attachment assembly 42 may include a root insert 44 secured within a portion of the blade root 24, e.g. between inner and outer circumferential root walls (not shown), and a root bolt 46 coupled to and extending within and from the root insert 44 so as to project outwardly from a root end 48 of the blade root 24. The root inserts 44 may be any suitable tubular insert configured to receive the root bolts 46. For example, in certain embodiments, the root inserts 44 may be tubular sleeves having an internal threaded opening which accepts the root bolts 46, which will be described in more detail herein. By projecting outwardly from the root end 48, the root bolts 46 may generally be used to couple the blade root 24 to the hub 20 via a pitch bearing 150 (FIG. 13) of the wind turbine 10. For example, the pitch bearing 150 may define a plurality of bolt holes 151 (FIGS. 14-15) configured to receive the root bolts 46. Additionally, as will be described below, a portion of such root bolts 46 may also be utilized when the rotor blade 22 is being removed from and/or installed onto the hub 20.

Various embodiments of systems and methods manufacturing rotor blades 22 that can be easily removed and/or installed to and from atop a wind turbine tower 12 and methods for removing and/or installing rotor blades 22 to and from a wind turbine 10 will now be described with reference to FIGS. 4-27. For example, FIG. 4 illustrates a flow diagram of a method for retrofitting a rotor blade 22 for lifting and removing to and from a rotor 18 installed atop a wind turbine tower 12 and FIG. 5 illustrates a flow diagram of a method for manufacturing such a rotor blade 22. As such, the present disclosure is advantageous for new and existing blades.

More specifically, the rotor blade 22 may be manufactured so as to include one or more lifting devices 101 configured therein. For example, as shown in FIGS. 6-9, each of the lifting devices 101 may include a cylindrical member 102 and a corresponding attachment component 106. Thus, as shown at 252 of FIG. 5, the method 250 may include providing a plurality of root inserts 44 for a blade root 24 of the rotor blade 22. As shown at 254, the method 250 includes securing at least one cylindrical member 102 to one of the plurality of root inserts 44 such that the cylindrical member 102 is substantially perpendicular with the root inserts 44, e.g. as shown in FIGS. 6 and 7. As shown at 256, the method 250 includes arranging the plurality of root inserts 44 in a blade mold of the rotor blade 22. Thus, as shown at 258, the method 250 includes forming a blade shell of the rotor blade 22 with the plurality of root inserts 44 laminated therein.

In one embodiment, the cylindrical member(s) 102 may include one or more openings 104 configured to receive a root bolt and an open passageway 108 configured to receive an attachment component 106. Thus, the method 250 may also include inserting the root bolt 46 through the opening(s) 104 of each of the cylindrical members 102. Further, the method 250 may include securing at least one attachment component 106 within the open passageway 108 of each of the cylindrical members 102. Thus, the attachment component(s) 106 provide an attachment location for a pulley cable (e.g. 106) used to lift and lower the rotor blade 22 to and from the rotor 18 installed atop the tower 12. More specifically, as shown in FIGS. 8 and 9, the attachment component(s) 106 may include a barrel nut component 109 and a hook component 106. Thus, the method 250 may also include inserting the root bolt 46 through the barrel nut component 109, e.g. through the threaded opening 107 thereof In additional embodiments, the step of securing the attachment component(s) 106 within each of the cylindrical members 102 may include inserting the barrel nut component 109 of the attachment component 106 within the cylindrical member 102 and securing a first end of at least one of the root bolts 46 within the barrel nut component 109, e.g. as shown in FIG. 8

In further embodiments, the step of securing the cylindrical member(s) 102 to one or more of the plurality of root inserts 44 may include welding the cylindrical member 102 to one of the plurality of root inserts 22.

In yet another embodiment, the method 250 may include securing the cylindrical member(s) 102 to one or more of the plurality of root inserts 44 such that the cylindrical member 102 intersects the root insert 44, e.g. as shown in FIG. 6. Alternatively, the method 250 may include securing the cylindrical member(s) 102 to a first end of one or more of the plurality of root inserts 44, wherein an outer diameter 119 of the at least one cylindrical member 102 is adjacent to the first end of the root insert 44 but does not intersect the root insert, e.g. as shown in FIG. 7.

Referring to FIG. 4, the system 100 of the present disclosure can also be used to retrofit an existing rotor blade 22. Thus, as shown at 202, the method 200 may include installing at least one of the lifting devices 101 within the blade root 24. Thus, as shown at 204, the method 200 may also includes installing the cylindrical member 102 of the lifting device 101 within the blade root 24 such that the cylindrical member 102 is substantially perpendicular with the root insert 44, e.g. as shown in FIGS. 6-8. For example, in one embodiment, the step of installing the cylindrical member 102 within the blade root 24 may include machining at least one opening 103 (FIG. 6) in an interior wall 105 of the blade root 24 of the rotor blade 22 and inserting the cylindrical member 102 in the opening 103. This process can be repeated for any number of lifting devices 101. In addition, as shown in FIG. 7, the method 200 may include machining the opening(s) 103 adjacent to the root inserts 44. Thus, in certain embodiments, an outer diameter 119 of the cylindrical member(s) 102 may be adjacent to a first end 113 of one of the root bolts 46. Accordingly, in such embodiments, the cylindrical member(s) 102 may be configured such that the members 102 do not intersect the root inserts 44.

Alternatively, as shown in FIG. 6, the method 200 may include machining the opening(s) 103 through the root inserts 44 such that the cylindrical members 102 extend through and/or intersect the root inserts 44. Thus, in such embodiments, the root bolts 46 may be configured through the cylindrical members 102. Further, as shown, the cylindrical member(s) 102 may include at least one lateral opening 104 configured to receive one of the root bolts 46.

In additional embodiments, as mentioned, the method 200 may include securing the cylindrical members 102 to the root inserts 44. For example, in certain embodiments, the step of securing the cylindrical members 102 to the root inserts 44 may include welding the cylindrical members 102 to the root inserts 44. In further embodiments, the cylindrical members 102 may be secured to root inserts 44 using any other suitable methods, including but not limited to adhesives or mechanical fasteners.

Referring back to FIG. 4, as shown at 206, the method 200 also includes securing the attachment component 106 of the lifting device 101 within the cylindrical members 102, e.g. after the rotor blade 22 has been retrofitted with the cylindrical members 102. More specifically, as shown in FIG. 8, the attachment component 106 of the lifting device 101 may be configured to fit at least partially within an open passageway 108 of the cylindrical members 102. Further, as mentioned and as shown in FIGS. 8 and 11, the attachment component(s) 106 may include a barrel nut component 109 and a hook component 111. More specifically, as shown, the barrel nut component 109 may include a round body with a threaded opening 107 with threads generally perpendicular to the length of the body. In addition, the threaded opening 107 may be configured to align with the opening 104 of the cylindrical members 102 when installed within the open passageway 108. As such, as shown in FIG. 8, the method 200 may include inserting the barrel nut component 109 of the attachment component 106 within the cylindrical member 102. Further, the method 200 may include securing a first end 113 of one of the root bolts 46 through the opening 104 of the cylindrical member 102 and within the threaded opening 107 of the barrel nut component 109. As such, in certain embodiments, the root bolts 46 may be configured to extend through the opening 104 of the cylindrical member 102 and through the threaded opening 107 of the attachment component 106. Thus, when the attachment components 106 are installed in the cylindrical members 102, the hook components 111 thereof provide one or more attachment locations for a plurality of pulley cables (e.g. cables 116) that can be used to lift and lower the rotor blade 22 to and from the rotor 18 installed atop the tower 12.

More specifically, as shown in FIGS. 8-11, various views of an attachment component 106 according to the present disclosure is illustrated. For example, as shown in FIGS. 9 and 10, when the barrel nut component 109 is inserted into the cylindrical member 102, the hook component 111 abuts against an internal wall 105 of the blade root 24. In addition, in certain embodiments, the hook component 11 may further include a gate 117 that allows for easy insertion of one or more brackets 115 and/or pulley cables 116 into the hook component 111. More specifically, the gate 117 may be spring-loaded so as to stay closed unless pressure is applied thereto. Thus, the hook component(s) 111 provides an attachment location for one or more pulley cable 116. More specifically, as shown in FIGS. 9 and 10, the method 200 may include attaching at least one pulley cable 116, e.g. via a bracket 115, to each of the hook components 111 of the attachment components 106, e.g. by applying pressure to the gate 117 such that the gate 117 opens and the bracket 115 can be inserted therethrough.

It should be appreciated that, although the systems and methods of the present disclosure will generally be described with reference to removing a rotor blade 22 from a wind turbine 10 that has been adapted using the lifting device(s) 101 as described herein, the various method steps and system components disclosed herein may similarly be used to install a rotor blade 22 onto a wind turbine 10 by simply reversing the order in which the method is performed. It should also be appreciated that, although the methods will be described herein as being performed in a particular order, the methods may generally be performed in any suitable order that is consistent with the disclosure provided herein.

For example, as shown in FIG. 12, the rotor blade 22 as described herein can be removed by initially rotating the rotor blade 22 to a vertically downward position (e.g., a six o'clock position) such that the blade 22 has a generally vertical orientation relative to the support surface 14 of the wind turbine 10. For example, as shown, the rotor blade 22 is extending vertically downward from the hub 20 such that the blade tip 26 is pointing towards the support surface 14. It should be appreciated that, due to a tilt angle and/or cone angle of the wind turbine 10, the rotor blade 22 may be angled slightly away from the tower 12 when moved to the vertically downward position.

In several embodiments, once the rotor blade 22 is rotated to the vertically downward position, an optional blade support 50 may be installed onto the blade 22 to provide attachment points for various cables and/or lines of the present disclosure and/or to provide protection to the rotor blade 22. Further, as shown in FIG. 12, the blade support 50 may be installed at an intermediate location 52 defined between the blade root 24 and the blade tip 26.

Still referring to FIG. 12, to install the blade support 50 onto the rotor blade 22, one or more lift cables 56 may be secured to the blade sock 50 and may extend upward to an up-tower location, such as at a location on and/or within the hub 20 or the nacelle 16. For instance, in one embodiment, the lift cable(s) 56 may extend upward from the blade support 50 to personnel located within and/or on top of the hub 20 or the nacelle 16. Regardless, the lift cable(s) 56 may be used to lift the blade support 50 vertically upwards relative to the support surface 14 to allow the support 50 to be installed around the rotor blade 22 at the intermediate location 52. For instance, the blade support 50 may define a closed shape configured to extend around the outer perimeter of the rotor blade 22. Thus, when lifting the blade support 50 via the lift cable(s) 56, the support 50 may be carefully aligned with the rotor blade 22 such that the blade tip 26 is received within the support 50. It should also be understood by those of ordinary skill in the art that the system and method as described herein can operate without the use of the blade support 50. In such an embodiment, the cables and/or guide cables as described herein may be attached directly to the rotor blade 22.

Referring now to FIG. 13, the rotor blade 22 may be initially lowered from the hub 22 by an initial vertical distance 58. As will be described below, such initial lowering of the rotor blade 22 may allow for one or more up-tower pulleys 180, 182 to be coupled between the blade 22 and another up-tower component of the wind turbine 10, thereby providing a means for further lowering the rotor blade 22 in the direction of the support surface 14 according to the present disclosure. Thus, the initial vertical distance 58 may generally correspond to any suitable distance that allows for the installation of the pulley(s) and any associated pulley cable(s) or pulley cable(s). For example, in one embodiment, the initial vertical distance 58 may generally range from about 2 feet to about 15 feet, such as from about 3 feet to about 10 feet or from about 5 feet to about 10 feet and any other subranges therebetween.

Referring now to FIGS. 14-16, one embodiment of suitable components that may be included within a lowering system to initially lower the rotor blade 22 from the hub 20 is illustrated in accordance with aspects of the present subject matter. Specifically, FIG. 14 illustrates a partial perspective view of the hub 20, the rotor blade 22 and the pitch bearing 150 of the wind turbine 10 after the blade 22 has been lowered from the hub 20 by the initial vertical distance 58. FIG. 15 illustrates a partial, cross-sectional view of the interface between the rotor blade 22 and the pitch bearing 150 prior to the blade 22 being lowered relative to the hub 20. Additionally, FIG. 16 illustrates a top view of the pitch bearing 150 of the wind turbine 10, particularly illustrating the relative circumferential positioning of the system components utilized to initially lower the rotor blade 22 relative to the hub 20.

It should be appreciated that, for purposes of illustration, only the inner race of the pitch bearing 150 is shown. As is generally understood, the pitch bearing 150 may also include an outer race configured to be coupled to the hub 20. As such, when the inner race is rotated relative to the outer race of the pitch bearing 150, the rotor blade 22 may be pitched about its pitch axis.

As particularly shown in FIGS. 14 and 15, to allow the rotor blade 22 to be initially lowered, several of the root bolts 46 extending through the bolt holes 151 defined in the pitch bearing 150 may be removed and replaced with suitable support cables 152. For example, as shown in FIG. 14, in one embodiment, eight of the root bolts 46 have been removed and replaced with corresponding support cables 152. In doing so, the remainder of the root bolts 46 may be initially maintained in engagement with the pitch bearing 150 (e.g., via suitable attachment nuts (not shown)) to allow the rotor blade 22 to continue to be supported by the hub 20 until the rotor blade 22 is ready to be lowered.

In general, the support cables 152 may correspond to any suitable cables that are capable of supporting the weight of the rotor blade 22 as it is being lowered relative to the hub 20. For example, in several embodiments, each support cable 152 may correspond to a steel cable or any other suitable wire rope that has a rated load capacity sufficient to handle the weight of the rotor blade 22. In another embodiment, each support cable 152 may correspond to a metal chain or any other suitable elongated cable-like object. Moreover, it should be appreciated that each support cable 152 may generally be configured to define any suitable length that permits the cables to be utilized to lower the rotor blade 22 away from the hub 20 by the initial vertical distance 58.

In addition, the support cables 152 may generally be configured to be coupled to the rotor blade 22 using any suitable attachment means. For example, as shown in the illustrated embodiment, a stud end 154 (FIG. 15) of each cable 152 may be coupled to a threaded cable stud 156 configured to be screwed into one of the root inserts 44 extending within the blade root 24. In such an embodiment, a swaged or other suitable connection may be formed between the root end 154 of each cable 152 and each cable stud 156 to securely couple to the cables 152 to the corresponding studs 156. In other embodiments, the support cables 152 may be coupled to the blade root 24 using any other suitable means, such as by coupling each support cable 152 to a suitable mounting fixture configured to be secured to the blade root 24.

It should be appreciated that, in embodiments in which the support cables 152 are coupled to the blade root 24 via the threaded cable studs 156, each cable stud 156 may generally be configured to define any suitable length 157. As shown in FIG. 15, in one embodiment, the length 157 of each cable stud 156 may be substantially equal to a corresponding length 159 of the root bolts 46. Alternatively, the length 157 of each cable stud 156 may be less than the length 159 of the root bolts 46.

As shown in FIGS. 14 and 15, each support cable 152 may be configured to be in operative association with a suitable cable translation device 158 positioned within the hub 20. In general, each cable translation device 158 may correspond to any suitable device that allows for the rotor blade 22 to be safely and securely moved relative to the hub 20 using the support cables 152. For example, in several embodiments, each cable translation device 152 may correspond to a fluid-driven actuator (e.g., a hydraulic or pneumatic actuator) configured to be in operative association with a corresponding support cable 152 to allow the rotor blade 22 to be lowered and/or raised relative to the hub 20.

Specifically, in a particular embodiment of the present subject matter, each cable translation device 158 may be configured as a hollow lifting/lowering cylinder or as a single strand jack designed to incrementally lower and/or raise the rotor blade 22. For example, as shown in FIG. 15, each device 158 may include a cylinder 160 configured to be coupled to the pitch bearing 150 (e.g., via suitable bolts and/or other mechanical fasteners (not shown)) and a hollow piston 162 configured to receive one of the support cables 152. The piston 162 may generally be configured to be actuated and retracted relative to the cylinder 160 by supplying/expelling a pressurized fluid to/from the cylinder 160 (e.g., via fluid port 164). In addition, each cable translation device 158 may include an upper clamping mechanism 166 positioned directly above the piston 162 and a lower clamping mechanism 168 positioned directly below the piston 162. As is generally understood, the upper and lower clamping mechanisms 166, 168 may be configured to alternatively clamp the support cable 152 as the piston 162 is actuated and retracted, thereby allowing each translation device 152 to lower or raise the rotor blade 22 in short increments with each actuation/retraction of the piston 162.

Additionally, in several embodiments, a stop block 170 may be configured to be installed around each support cable 152 directly above its corresponding cable translation device 158. In general, each stop block 170 may be configured to serve as a built-in safety feature providing a mechanical stop for each support cable 152 in the event of failure of one of the cable translation devices 158. For example, as particularly shown in FIGS. 15 and 17, each support cable 152 may include a plurality of lugs 172 spaced apart incrementally along the cable's length. In such an embodiment, an opening or slot (not shown) may be defined through each stop block 170 that is dimensionally larger than the cable 152, thereby allowing the cable 152 to pass through the stop block 170 as it is being lowered relative to the translation device 158. However, given their increased size, the lugs 172 may not be capable of passing through the opening or slot defined in each stop block 170. Accordingly, in the event of failure of one of the cable translation devices 158, the lug 172 positioned immediately above the corresponding stop block 170 may come into contact with and engage an upper surface of the block 170, thereby preventing further motion of the support cable 152 relative to the translation device 158. In contrast, during normal operation, the stop blocks 170 may be continuously repositioned along the support cable 152 as each lug 172 is lowered down onto and/or adjacent to its corresponding stop block 170. For example, as indicated by the dashed lines in FIG. 16, when one of the lugs 172 is lowered down into and/or adjacent to one of the stop blocks 170, the stop block 170 may be removed from the support cable 152 and repositioned above such lug 172 to allow the support cable 152 to continue to be lowered through the translation device 158.

It should be appreciated that, in general, each support cable 152 and corresponding translation device 158 may be configured to be installed at any suitable location around the circumference of the blade root 24 and pitch bearing 150. However, in several embodiments, the cables/devices 152, 158 may be grouped in pairs spaced apart around the blade root 24 and pitch bearing 150. For example, as shown in FIG. 16, in one embodiment, each pair of the cable translation devices 158 may be configured to be positioned around the pitch bearing 150 at circumferential locations generally adjacent to a reference line 174 oriented perpendicularly to a tower reference line 176 extending radially from the center of the wind turbine's tower 12 through the center of the pitch bearing 150. Specifically, as shown, each pair of the cable translation devices 158 may generally be spaced apart circumferentially from the reference line 174 by an angle 178 equal to less than about 45 degrees, such as less than about 40 degrees or less than about 35 degrees. Of course, in such an embodiment, the support cables 152 may similarly be secured to the blade root 24 at a corresponding circumferential location relative to the reference line 174. Such positioning of the cables/devices 152, 158 adjacent to the reference line 174 may, in certain rotor blade configurations, allow for the rotor blade 22 to be slightly angled away from the tower 12 as the blade 22 is being lowered relative to the hub 20 due to the location of the blade's center of gravity.

As indicated above, in one embodiment, eight support cables 152 and corresponding translation devices 158 may be installed to assist in lowering the rotor blade 22 relative to the hub 20. However, in other embodiments, any other suitable number of support cables 152 and translation devices 158 may be utilized to lower the rotor blade 22 relative to the hub 20. For instance, in one embodiment, the rotor blade 22 may be lowered using only four cables/devices 152, 158 or using only two cables/devices 152, 158. In addition, it should be appreciated that, in further embodiments of the present subject matter, the rotor blade 22 may be configured to be initially lowered from the hub 20 using any other suitable lowering means known in the art. For instance, as an alternative to the fluid-driven cable translation devices 158 described above, the cable translation devices may correspond to winches 130 positioned within the hub 20, for example, as shown in FIG. 18.

Once the rotor blade 22 has been initially lowered, the rotor blade 22 can be lowered to the ground using any suitable means. In addition, the rotor blade 22 can be lifted from the support surface 14 to the rotor 18 secured atop the tower 12 using any suitable means. For example, FIG. 18 illustrates a partial, perspective view of the hub 20, the rotor blade 22, and the pitch bearing 150 of the wind turbine 10 after the blade 22 has been lowered from the hub 20 by the initial vertical distance 58. FIG. 19 illustrates a partial, perspective view of the interior of the hub 20 at the interface between the rotor blade 22 and the pitch bearing 150 prior to the blade 22 being lowered relative to the hub 20.

As particularly shown in FIGS. 18 and 19, to allow the rotor blade 22 to be lowered, the rotor blade 22 is adapted using the lifting device(s) 101 as described herein. Thus, each lifting device 101 is configured to allow a corresponding support cable 112 to be coupled to the interior wall 105 of the blade root 24. It should be appreciated that the lifting device(s) 101 may generally have any suitable configuration that allows each device 101 to be inserted through the blade root 24 as well as to provide a means for coupling each support cable 112 to the rotor blade 22. For example, in one embodiment, each lifting device 101 may be configured as a modified barrel nut, e.g. as shown in FIG. 11. For instance, as shown in FIGS. 8 and 11, each lifting device 101 may include a threaded opening 107 extending vertically through the cylindrical member 102 of the lifting device 101 to allow a corresponding root bolt 46 or other suitable threaded member to be coupled to the lifting device 101 and extend vertically therefrom. In addition, the cylindrical member 102 of each lifting device 101 may include a laterally extending opening 108 defined through the longitudinal length of the cylindrical member 102. As shown in FIG. 8, such opening 108 may allow for the attachment component 106 (e.g., a swivel eye, mount ring, mount hook or any other suitable attachment mechanism) to be secured within the opening 108 of the cylindrical member 102 for coupling each support cable 112 to the rotor blade 22.

As indicated above, in one embodiment, four lifting devices 101 may be installed through the blade root 24 to allow four corresponding support cables 112 to be coupled to the rotor blade 22. However, in other embodiments, any other suitable number of lifting devices 101 may be secured within the blade root 24 to provide a means for coupling a corresponding number of support cables 112 to the rotor blade 22, such as by installing less than four lifting devices 101 within the blade root 24 (e.g., two or three lifting devices 101) or greater than four lifting devices 101 within the blade root 24 (e.g., five, six or more support nuts).

Additionally, it should be appreciated that the lifting devices 101 may be configured to be maintained in position relative to the rotor blade 22 using any suitable attachment means. For instance, in one embodiment, once a given lifting device 101 is installed within the blade root 24, a corresponding root bolt 46 may be inserted through the pitch bearing 150 and screwed into the vertically extending opening 104 of the lifting device 101 in order to secure the device 101 within the blade root 24. In addition, as shown in FIGS. 6 and 7, the cylindrical member 102 of each lifting device 101 may be secured to individual root inserts 44, e.g. via welding.

It should also be appreciated that each lifting device 101 may generally be configured to be installed within the rotor blade 22 at any suitable circumferential location around the blade root 24. However, in several embodiments, the lifting devices 101 may be configured to be installed at the same or similar locations to the circumferential locations for the cables/devices 152/158 described above. For instance, in one embodiment, the lifting devices 101 may be configured to be installed within the blade root 24 at circumferential locations spaced apart from the reference line 174 by a given angle 178 (FIG. 16), wherein the angle is generally equal to less than about 45 degrees.

Referring particularly to FIGS. 18 and 19, in several embodiments, each support cable 112 may be configured to extend from one of the lifting devices 101 to a corresponding cable translation device 130 positioned within the hub 20. For example, as shown, the cable translation device 130 may correspond to cable hoists (including chain hoists) configured to be mounted to and/or supported by any suitable wind turbine component(s) positioned within the hub 20 (e.g., the hub gusset(s), joist(s) and/or any other suitable component(s)). As is generally understood, cable hoists may be configured to allow suitable cables to be passed therethrough in a controlled manner. Thus, in the present application, such cable hoists may be utilized to safely and effectively lower the rotor blade 22 relative to the hub 20.

It should be appreciated that, in alternative embodiments, the cable translation devices 130 may correspond to any other suitable devices and/or mechanisms that allow for the rotor blade 22 to be lowered relative to the hub 20 via the corresponding support cables 112. For instance, in another embodiment, the cable translation devices 130 may correspond to winches and/or pulleys positioned within the hub 20.

It should also be appreciated that, similar to the support cables 152 described above, each support cable 112 may generally correspond to any suitable elongated cable-like object that has a rated load capacity sufficient to handle the weight of the rotor blade 22. For instance, as shown in the illustrated embodiment, the support cables 112 are configured as metal chains. However, in other embodiments, the support cables 112 may correspond to steel cables or any other suitable wire ropes. Moreover, it should be appreciated that each support cable 112 may generally be configured to define any suitable length that permits the cables 302 to be utilized to lower the rotor blade 22 away from the hub 20 by the initial vertical distance 58.

Referring now to FIG. 20, after lowering the rotor blade 22 from the hub 20 by the initial distance 58, one or more up-tower pulleys 180, 182 may be used to couple one or more pulley cables 116 between the rotor blade 22 and a main or first winch 132 supported on and/or adjacent to the support surface 14. For example, as shown, the pulley cable 116 may be configured to be operatively coupled around one or more up-tower pulleys 180, 182 coupled to the rotor blade 22 and/or to one or more up-tower components of the wind turbine 10 (e.g., the rotor 18 or the pitch bearing 150). By coupling the pulley cable 116 between the first winch 132 and the rotor blade 22 via the pulleys 180, 182, the pulley cable 116 may be slowly unwound or otherwise released from the winch 132, thereby allowing the rotor blade 22 to lowered from the hub 20 in a controlled manner.

It should be appreciated that, as the rotor blade 22 is being lowered using the pulley cable 116, a guide line 110 may also be utilized to control the orientation of the rotor blade 22 as the blade 22 is being lowered. Specifically, as shown in FIG. 20, by securing the rotor blade 22 to the guide line 110 via a guide cable 120 over guide pulley 118, the rotor blade 22 may be maintained a safe distance away from the tower 12. In addition, the guide line 110, in combination with the guide cable 120 and the guide pulley 118, may also be utilized to rotate the rotor blade 22 into a generally horizontal position prior to lowering the blade 22 onto and/or directly adjacent to support surface 14, which is described in more detail in regards to FIGS. 25 and 26.

Referring now to FIGS. 21-24, various examples of different up-tower pulley arrangements are illustrated in accordance with aspects of the present subject matter. Specifically, in each example shown, one or more pulleys 180 are coupled to the pitch bearing 150 and one or more pulleys 182 are coupled to the rotor blade 22. However, in other embodiments, the pulley(s) 180 may be configured to be coupled to any other suitable up-tower component(s) of the wind turbine 10 in addition to the pitch bearing 150. For instance, as an alternative to coupling the up-tower pulley(s) 180 to the pitch bearing 150, such pulley(s) 180 may be coupled to the hub 20 (e.g., by coupling the pulley(s) 180 within the interior of the hub 20), the nacelle 16 or any other suitable up-tower component of the wind turbine 10.

As shown in FIG. 21, in one embodiment, a single pulley 180 may be coupled to the pitch bearing 150 and pulleys 182A, 182B may be coupled to the blade root 24 of the rotor blade 22. In such an embodiment, pulley 180 may, for example, be vertically aligned with one of the pulleys 182A, 182B (e.g., pulley 180A) on a first side of the blade/bearing 22, 150, with the other pulley (e.g., pulley 182B) being positioned on an opposite of the blade 22. Additionally, as shown in FIG. 21, a pulley cable 116 may be coupled to the pitch bearing 150 (or the hub 20) at an attachment location 192 such that the cable 116 may be operatively coupled around the pulleys 180, 182A, 182B as the line 116 extends between the attachment location 192 and the first winch 132 (FIG. 20) positioned on and/or adjacent to the support surface 14 of the wind turbine 10. Thus, as the lifting cable 116 is unwound from or otherwise released by the first winch 132, the cable 116 may follow a path (as indicated by arrows 194) extending from pulley 180 around pulley 182A and then around the pulley 182B as the rotor blade 22 is lowered.

In another embodiment, as shown in FIG. 22, up-tower pulleys 180A, 180B may be coupled to the pitch bearing 150 and pulleys 182A, 182B may be coupled to the blade root 24 of the rotor blade 22. In such an embodiment, pulley 180A may, for example, be vertically aligned with one of the pulleys 182A, 182B (e.g., pulley 182A) on a first side of the blade/bearing 22, 150, with the other pulley 182B being positioned on an opposite of the blade 22. Additionally, pulley 180B may be positioned at a location defined horizontally between pulleys 182A and 182B. Moreover, as shown in FIG. 22, a lifting cable 116 may be coupled to the pitch bearing 150 (or the hub 20) at an attachment location 192 such that the cable 116 may be operatively coupled around the up-tower pulleys 180A, 180B, 182A, 182B as the cable 116 extends between the attachment location 192 and the first winch 132 (FIG. 21) positioned on and/or adjacent to the support surface 14 of the wind turbine 10. Thus, as the pulley cable 116 is unwound from or otherwise released by the winch 132, the cable 116 may follow a path (as indicated by arrows 194) from pulley 180A around pulley 182A and then from pulley 180B around pulley 182B as the rotor blade 22 is being lowered.

In a further embodiment, as shown in FIG. 23, up-tower pulleys 180A, 180B may be coupled to the pitch bearing 150 and pulleys 182A, 182B may be coupled to the blade root 24 of the rotor blade 22. However, unlike the example shown in FIG. 22, pulley 180A may be vertically aligned with one of the pulleys (e.g., the first blade pulley 182A) on a first side of the blade/bearing 22, 150 and pulley 180B may be vertically aligned with pulley 182B on an opposite of the blade/bearing 22, 150. Additionally, as shown in FIG. 23, a lifting cable 116 may be coupled to the blade root 24 at an attachment location 192 such that the cable 116 may be operatively coupled around the pulleys 180A, 180B, 182A, 182B as the cable 116 extends between the attachment location 192 and the first winch 132 positioned on and/or adjacent to the support surface 14 of the wind turbine 10. Thus, as the pulley cable 116 is unwound from or otherwise released by the winch 132, the cable 116 may follow a path (as indicated by arrows 194) extending from pulley 180A around pulley 182A and then from pulley 180B around pulley 182B as the rotor blade 22 is being lowered.

As yet another example, as shown in FIG. 24, up-tower pulley 180 may be coupled to the pitch bearing 150 and up-tower pulley 182 may be coupled to the blade root 24 of the rotor blade 22. In such an embodiment, one or both of the pulleys 180, 182 may correspond to a double pulley. For instance, as shown in FIG. 18, pulley 180 is configured as a double pulley and, thus, includes double pulley slots 195 and 196 for receiving a cable. Additionally, as shown in FIG. 24, a lifting cable 116 may be coupled to the blade root 24 at an attachment location 192 such that the cable 186 may be operatively coupled around the pulleys 180, 182 as it extends between the attachment location 192 and the first winch 132 positioned on and/or adjacent to the support surface 14 of the wind turbine 10. Thus, as the lifting cable 116 is unwound from or otherwise released by the winch 132, the cable 116 may follow a path (as indicated by arrows 194) extending from pulley slot 195 of pulley 180 around pulley 182 and then back around pulley slot 196 of pulley 180.

Referring now to FIG. 25, yet another embodiment of a suitable pulley arrangement is illustrated in accordance with aspects of the present subject matter. As shown in FIG. 25, up-tower pulleys 180A, 180B may be supported adjacent to the hub 20 by corresponding support straps 214 extending around the remaining "rabbit-eared" rotor blades 22. Specifically, up-tower pulley 180A may be supported by a first support strap 214 extending around one of the remaining rotor blades 22 and up-tower pulley 180B may be supported by a second support strap 216 extending around the other remaining rotor blade 22. In such an embodiment, pulleys cables 116A, 116B may be configured to be coupled between the rotor blade 22 and the first winch(es) 112 supported on and/or adjacent to the support surface 14. Thus, as the pulley cables 116A, 116B are unwound from or otherwise released by the winch(es) 132, 134, each cable 116A, 116B may extend up to and around its corresponding up-tower pulley 180A, 180B (as indicated by arrows 194) to allow the rotor blade 22 to be lowered relative to the hub 20 in a controlled manner.

Referring to FIGS. 20, 26, and 27, the guide line 110 may be attached from a second ground winch 134 to an up-tower location of the wind turbine 10, e.g. the rotor 18, and control an orientation of the rotor blade 22 as it is being lowered to the support surface 14. More particularly, the guide line 110 includes a guide pulley 118 mounted thereto and a corresponding guide cable 120 configured over the guide pulley 118 and attached to the rotor blade 22. Thus, the guide pulley 118 is configured to move along the guide line 110 during raising and/or lifting of the rotor blade 22 such that the guide pulley 118 can move with the rotor blade 22 and the guide cable 120 can maintain contact with the rotor blade 22.

The guide line 110 may be attached to the up-tower location of the wind turbine 10 using any suitable means. For example, in one embodiment, the guide line 110 may have a stud end that may be coupled to a threaded cable stud configured to be screwed into a corresponding nut extending within the up-tower location of the wind turbine 10. In other embodiments, the guide line 110 may be coupled to the up-tower location of the wind turbine 10 using any other suitable means, such as by coupling the guide line 110 to a suitable mounting fixture configured to be secured to the up-tower location of the wind turbine 10. In certain embodiments, the guide line 110 may correspond to a steel cable or any other suitable wire rope that has a rated load capacity sufficient to support at least a portion of the weight of the rotor blade 22. Thus, the guide line 110 is configured to control the orientation of the rotor blade 22 as it is being raised or lowered.

Additionally, as shown in FIG. 27, as the rotor blade 22 is further lowered towards the support surface 14, the guide line 110 and corresponding guide cable 120 may be utilized to rotate the rotor blade 22 into a generally horizontal position in order to prevent the blade tip 26 from contacting the support surface 14 and to properly orient the rotor blade 22 relative to the support surface 14. For example, in various embodiments, the rotor blade 22 may be lowered until the blade 22 reaches a predetermined location. In certain embodiments, the predetermined location is determined by a stopping point of the up-tower pulleys 180, 182. More specifically, the stopping point of the up-tower pulleys 180, 182 may be controlled by an additional winch, a controlled pulley cable, an additional pulley, a fixed-length line, or similar. Further, when the rotor blade 22 reaches the predetermined location relative to the support surface 14, the guide line 110 can be designed such that the guide cable 120 has typically reached an end of the guide line 110. In addition, the guide cable 120 defines a predetermined length. Thus, once the rotor blade 22 reaches the predetermined location, the guide cable 120 maintains contact with the blade tip 26, while the first winch 132 continues to lower the blade root 24 such that the rotor blade 22 rotates to a generally horizontal position. For example, as shown in FIG. 26, the rotor blade 22 may be rotated so as to have a horizontal orientation extending generally parallel to the support surface 14. The pulley cable(s) 116 and the guide cable 120 may then be used to lower the rotor blade 22 down onto the support surface 14 or onto suitable blade supports positioned on the support surface 14.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for retrofitting a rotor blade for lifting and lowering to and from a rotor installed atop a tower, the rotor blade having a blade root with a plurality of circumferentially-spaced root bolts, each of the root bolts secured within a tubular root insert, the method comprising:
    installing at least one lifting device within the blade root, the lifting device comprising a cylindrical member and an attachment component, the attachment component comprising a barrel nut component and a hook component, wherein installing the at least one lifting device further comprises:
        installing the cylindrical member within the blade root such that the cylindrical member is substantially perpendicular with one of the root inserts; and,
        securing the attachment component within the installed cylindrical member, the attachment component providing an attachment location for a pulley cable used to lift and lower the rotor blade to and from the rotor installed atop the tower.

2. The method of claim 1, wherein installing the cylindrical member within the blade root further comprises:
    machining an opening in an interior wall of the blade root of the rotor blade; and
    inserting the cylindrical member in the opening.

3. The method of claim 2, further comprising machining the opening adjacent to the root insert.

4. The method of claim 3, wherein an outer diameter of the cylindrical member is adjacent to a first end of one of the root inserts but does not intersect the root insert.

5. The method of claim 2, further comprising machining the opening through the root insert such that the cylindrical member extends through the root insert.

6. The method of claim 1, further comprising welding the cylindrical member to the root insert.

7. The method of claim 1, further comprising attaching at least one pulley cable to each of the hook components of the attachment components.

8. The method of claim 7, wherein securing the attachment component within the cylindrical member of the blade root further comprises:
- inserting the barrel nut component of the attachment component within an open passageway of the cylindrical member, and
- securing a first end of at least one of the root bolts within the barrel nut component.

* * * * *